(12) United States Patent
Lewis et al.

(10) Patent No.: US 12,471,513 B2
(45) Date of Patent: Nov. 18, 2025

(54) TURF MOWER HYDRAULIC LIFT CONTROL SYSTEM AND METHOD

(71) Applicant: Textron Inc., Providence, RI (US)

(72) Inventors: Linton Linn Lewis, Aiken, SC (US); Matthew Jacob Noftsger, Evans, GA (US)

(73) Assignee: Textron Innovations Inc., Providence, RI (US)

( * ) Notice: Subject to any disclaimer, the term of this patent is extended or adjusted under 35 U.S.C. 154(b) by 573 days.

(21) Appl. No.: 17/939,140

(22) Filed: Sep. 7, 2022

(65) Prior Publication Data
US 2024/0074339 A1    Mar. 7, 2024

(51) Int. Cl.
*A01B 63/10* (2006.01)
(52) U.S. Cl.
CPC .................... *A01B 63/10* (2013.01)
(58) Field of Classification Search
CPC ....................................................... A01B 63/10
See application file for complete search history.

(56) References Cited

U.S. PATENT DOCUMENTS

| | | | |
|---|---|---|---|
| 4,864,805 A * | 9/1989 | Hager | A01D 75/30 56/11.9 |
| 5,309,699 A | 5/1994 | Ehn, Jr. | |
| 6,129,157 A | 10/2000 | Noonan et al. | |
| 7,730,705 B2 | 6/2010 | Kubinski | |
| 8,109,069 B2 * | 2/2012 | Moe | A01D 34/44 56/15.8 |
| 9,699,961 B2 | 7/2017 | Ito et al. | |
| 9,788,482 B2 | 10/2017 | Boruff et al. | |
| 2021/0259154 A1 | 8/2021 | Rinholm et al. | |

FOREIGN PATENT DOCUMENTS

| | | |
|---|---|---|
| JP | 2004016029 A | 1/2004 |
| JP | 2009261304 A | 11/2009 |

* cited by examiner

*Primary Examiner* — Matthew R Buck
(74) *Attorney, Agent, or Firm* — Sandberg Phoenix & von Gontard, P.C.

(57) ABSTRACT

An electro-hydraulic flow control system for controlling the movement of a cutting implement of a turf mower. The flow control system comprises a hydraulic system for raising and lowering the cutting implement. The hydraulic system comprises a hydraulic fluid, a hydraulic actuator, and a hydraulic pump. The control system additionally comprises an electromechanical fluid flow control system for controlling a flow of the hydraulic fluid through the hydraulic system. The electromechanical fluid control system comprises a routing valve, a float valve, a weight transfer valve, a weight transfer pressure adjustment (WTPA) valve, and a control module for control operation of the routing valve, the float valve, the weight transfer valve, and the WTPA valve to control operation of the actuator and thereby control movement of the cutting implement.

18 Claims, 16 Drawing Sheets

TURF MOWER HYDRAULIC LIFT CONTROL SYSTEM AND METHOD

FIELD

The present teachings relate to hydraulic lift systems, and more particularly to turf mower cutting deck hydraulic lift systems.

BACKGROUND

The statements in this section merely provide background information related to the present disclosure and may not constitute prior art.

Known turf mower cutting deck/implements hydraulic lift and lower systems are typically limited by the use of a fixed hydraulic fluid flow restriction in either the form of an orifice disc or an orifice plate. When this type of flow control is utilized the restriction generally continuous, which can have an unfavorable response on cutting performance of the cutting implements with regard to terrain contour following capability. For example, a more restrictive hydraulic fluid flow control orifice will generally provide a better lowering performance (i.e., the cutting implements will have slower descent rate), but will cause poor terrain contour following capability (i.e., slower response to changes in ground contour) of the cutting implements. Conversely, a less restrictive hydraulic fluid flow control orifice will generally cause a poor lowering performance (i.e., the cutting implements will have too fast of a descent rate), but will provide better terrain contour following capability (i.e., faster response changes in terrain or ground contour). Lowering the cutting implements too quickly can result in turf damage, while slow terrain contour following response can result in uneven cutting of grass.

SUMMARY

In various embodiments, the present disclosure provides a method of controlling the rate of hydraulic fluid flow in the hydraulic lift system of a turf mower during the lowering of cutting implements. The method utilizes an electro-hydraulic flow control system for regulating raising and lowering performance of cutting implements. More specifically, the present disclosure provides an electro-hydraulic flow control system for regulating the performance of the cutting implements. Generally, the electro-hydraulic flow control system selectively slows the rate of flow in the hydraulic lift system during the lowering of the cutting implements as if a traditional design restriction were installed, and then electronically eliminates the flow control to enable unrestricted floating of the cutting implements while mowing, thereby significantly improving ground contour following of the cutting implements. The flow control system is controlled by a programmable master control unit that determines which hydraulic control valves are to be energized and to what extent they are energized based upon the operating mode and operator control input.

For example, in various embodiments, the present disclosure provides an electro-hydraulic flow control system for controlling the movement of a cutting implement of a turf mower wherein the electro-hydraulic flow control system comprises a hydraulic system structured and operable to raise the cutting implement to transport mode and lower the cutting implement to a cutting mode. The hydraulic system comprises a hydraulic fluid tank structured and operable to retain hydraulic fluid, a hydraulic actuator connected to the cutting implement and structured and operable to raise and lower the cutting implement, a plurality of hydraulic fluid lines fluidly connecting the actuator to the tank, and a hydraulic pump fluidly connected to the tank and the actuator and structured and operable to pump hydraulic fluid from the tank to the actuator. The electro-hydraulic flow control system additionally comprises an electromechanical fluid flow control system structured and operable to control a flow of the hydraulic fluid through the hydraulic system. The electromechanical fluid control system comprising a routing valve structured and operable to be movable between a first position, and an second position to control the routing of the hydraulic fluid through the electromechanical fluid flow control system, a float valve structured and operable to be movable between a check position and a control position to bi-directionally control the flow of hydraulic fluid therethrough, a weight transfer valve structured and operable to be movable between weight transfer position and a closed position to allow the flow of hydraulic fluid to mono-directionally flow therethrough or prevent the flow of hydraulic fluid from flowing therethrough, a weight transfer pressure adjustment (WTPA) valve structured and operable to control the flow of hydraulic fluid therethrough from the weight transfer valve to the tank, and a control module structured and operable to control operation of the routing valve, the float valve, the weight transfer valve, and the WTPA valve to control operation of the actuator and thereby control movement of the cutting implement.

In various other embodiments, the present disclosure provides a turf mower comprising, in various instances, an internal combustion engine, a cutting implement structure and operable to cut turf, and an electro-hydraulic flow control system for controlling the movement of the cutting implement wherein the electro-hydraulic flow control system comprises a hydraulic system structured and operable to raise the cutting implement to transport mode and lower the cutting implement to a cutting mode. The hydraulic system comprises a hydraulic fluid tank structured and operable to retain hydraulic fluid, a hydraulic actuator connected to the cutting implement and structured and operable to raise and lower the cutting implement, a plurality of hydraulic fluid lines fluidly connecting the actuator to the tank, and a hydraulic pump fluidly connected to the tank and the actuator and structured and operable to pump hydraulic fluid from the tank to the actuator. The electro-hydraulic flow control system additionally comprises an electromechanical fluid flow control system structured and operable to control a flow of the hydraulic fluid through the hydraulic system. The electromechanical fluid control system comprising a routing valve structured and operable to be movable between a first position, and a second position to control the routing of the hydraulic fluid through the electromechanical fluid flow control system, a float valve structured and operable to be movable between a check position and a control position to bi-directionally control the flow of hydraulic fluid therethrough, a weight transfer valve structured and operable to be movable between weight transfer position and a closed position to allow the flow of hydraulic fluid to mono-directionally flow therethrough or prevent the flow of hydraulic fluid from flowing therethrough, a weight transfer pressure adjustment (WTPA) valve structured and operable to control the flow of hydraulic fluid therethrough from the weight transfer valve to the tank, and a control module structured and operable to control operation of the routing valve, the float valve, the weight transfer valve, and the WTPA valve to control operation of the actuator and thereby control movement of the cutting implement.

In yet other embodiments, the present disclosure provides a method for controlling the movement of a cutting implement of a turf mower, wherein the mower comprises a hydraulic system structured and operable to raise the cutting implement to transport mode and lower the cutting implement to a cutting mode. The hydraulic system includes a hydraulic fluid tank structured and operable to retain hydraulic fluid, a hydraulic actuator connected to the cutting implement and structured and operable to raise and lower the cutting implement, and a hydraulic pump fluidly connected to the tank and the actuator and structured and operable to pump hydraulic fluid from the tank to the actuator. The mower additionally comprises an electromechanical fluid flow control system structured and operable to control a flow of the hydraulic fluid through the hydraulic system. The electromechanical fluid control system includes a routing valve movable between a first position and a second position to control the routing of the hydraulic fluid through the electromechanical fluid flow control system, a float valve movable between a check position and a control position to bi-directionally control the flow of hydraulic fluid therethrough, a weight transfer valve movable between weight transfer position and a closed position to allow the flow of hydraulic fluid to mono-directionally flow therethrough or prevent the flow of hydraulic fluid from flowing therethrough, a weight transfer pressure adjustment (WTPA) valve structured and operable to control the flow of hydraulic fluid therethrough from the weight transfer valve to the tank, and a control module structured and operable to control operation of the routing valve, the float valve, the weight transfer valve, and the WTPA valve to control operation of the actuator and thereby control movement of the cutting implement. In various instances, the method comprises one of controlling, via the control module, the WTPA valve to meter the rate of flow therethrough to raise the cutting implement at the first speed to transport position at a first speed, and to lower the cutting implement to cutting position at the second speed, and controlling, via the control module, the float valve to meter the rate of flow therethrough to raise the cutting implement at a first speed to transport position at a first speed, and to lower the cutting implement to cutting position at a second speed.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
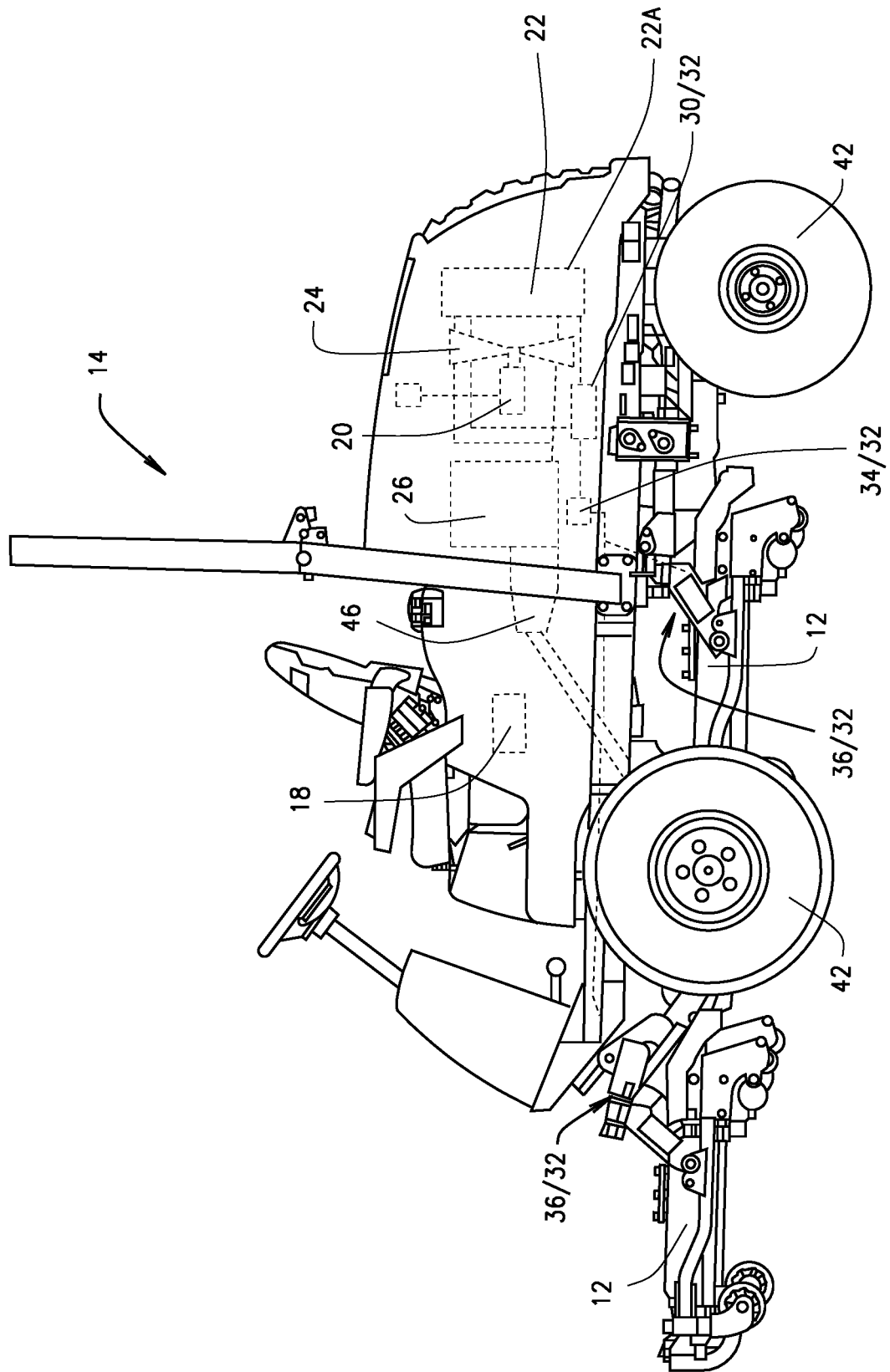
FIG. 1 is an exemplary illustration of a turf mower comprising an electro-hydraulic flow control (EHFC) system in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts or causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

The apparatuses/systems and methods described herein can be implemented at least in part by one or more computer program products comprising one or more non-transitory, tangible, computer-readable mediums storing computer programs with instructions that may be performed by one or more processors. The computer programs may include processor executable instructions and/or instructions that may be translated or otherwise interpreted by a processor such that the processor may perform the instructions. The computer programs can also include stored data. Non-limiting examples of the non-transitory, tangible, computer readable medium are nonvolatile memory, magnetic storage, and optical storage.

As used herein, the term module can refer to, be part of, or include an application specific integrated circuit (ASIC); an electronic circuit; a combinational logic circuit; a field programmable gate array (FPGA); a processor (shared, dedicated, or group) that performs instructions included in code, including for example, execution of executable code instructions and/or interpretation/translation of uncompiled code; other suitable hardware components that provide the described functionality; or a combination of some or all of the above, such as in a system-on-chip. The term module can include memory (shared, dedicated, or group) that stores code executed by the processor.

The term code, as used herein, can include software, firmware, and/or microcode, and can refer to one or more programs, routines, functions, classes, and/or objects. The term shared, as used herein, means that some or all code from multiple modules can be executed using a single (shared) processor. In addition, some or all code from multiple modules can be stored by a single (shared) memory. The term group, as used above, means that some or all code from a single module can be executed using a group of processors. In addition, some or all code from a single module can be stored using a group of memories.

Figure 2:
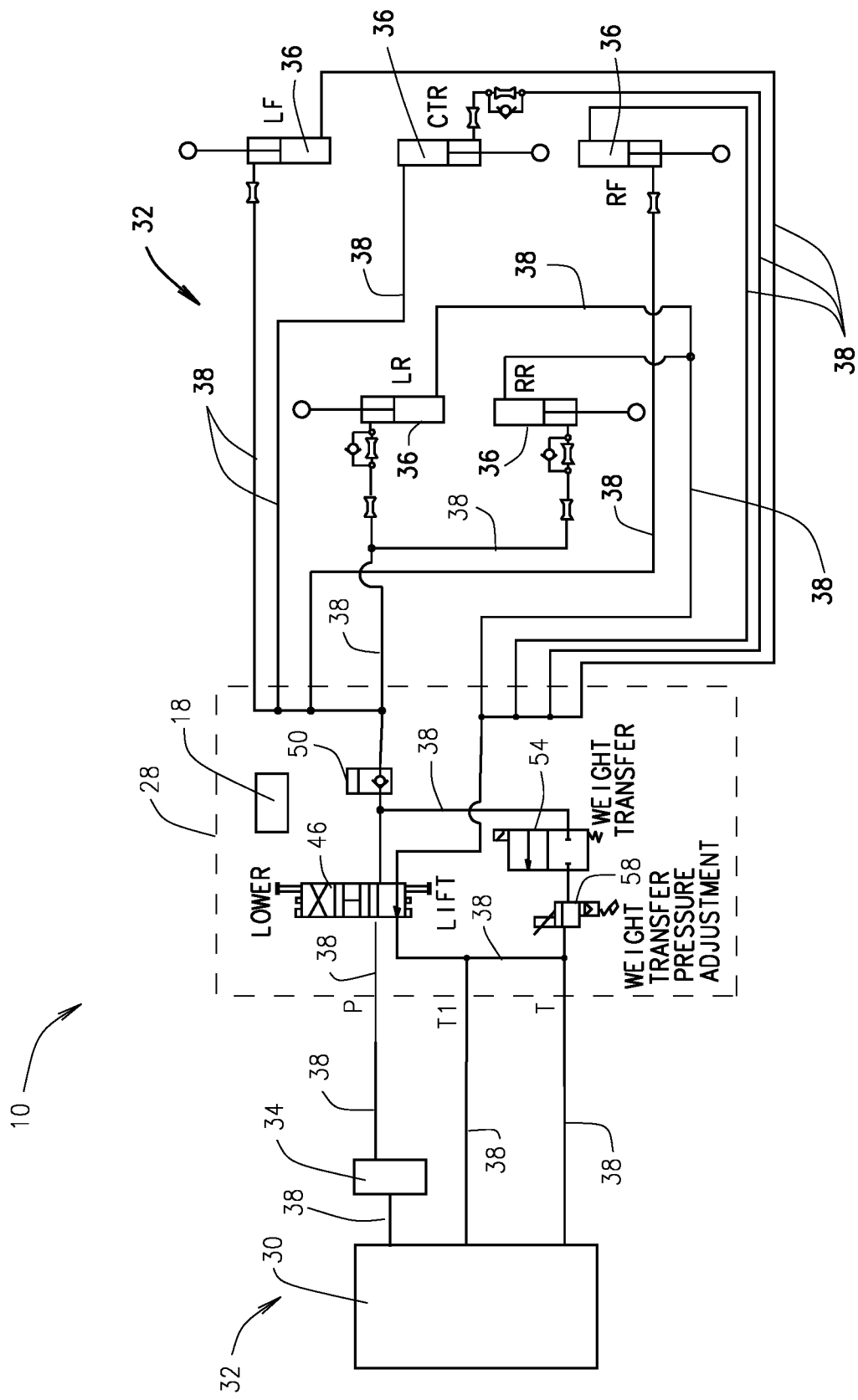
FIG. 2 is an exemplary schematic of the EHFC system in accordance with various embodiments of the present disclosure.
Figure 3:
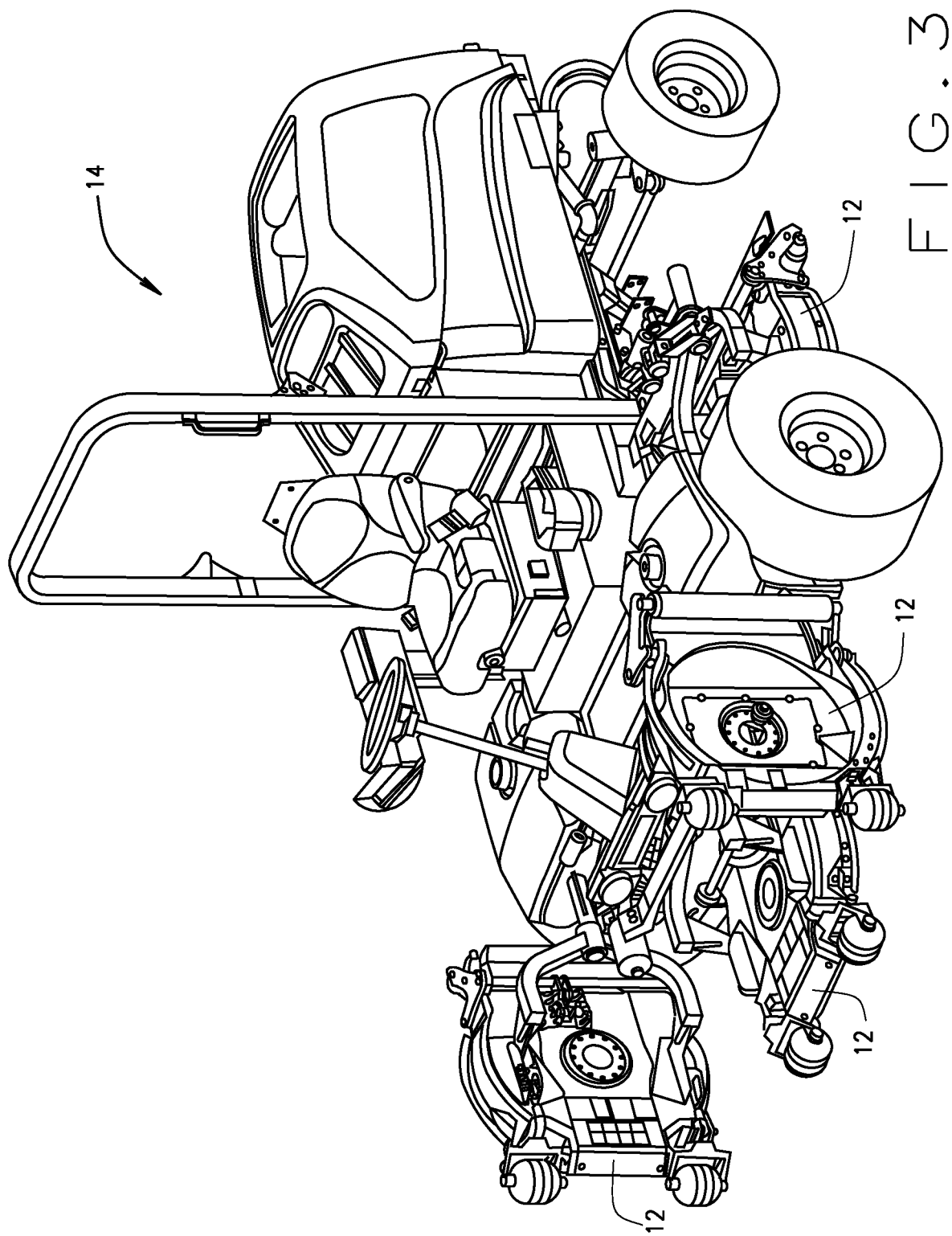
FIG. 3 is an exemplary illustration of the turf mower having a plurality of cutting implements thereof disposed in a raised position and configured in a transport mode in accordance with various embodiments of the present disclosure.
Figure 4:
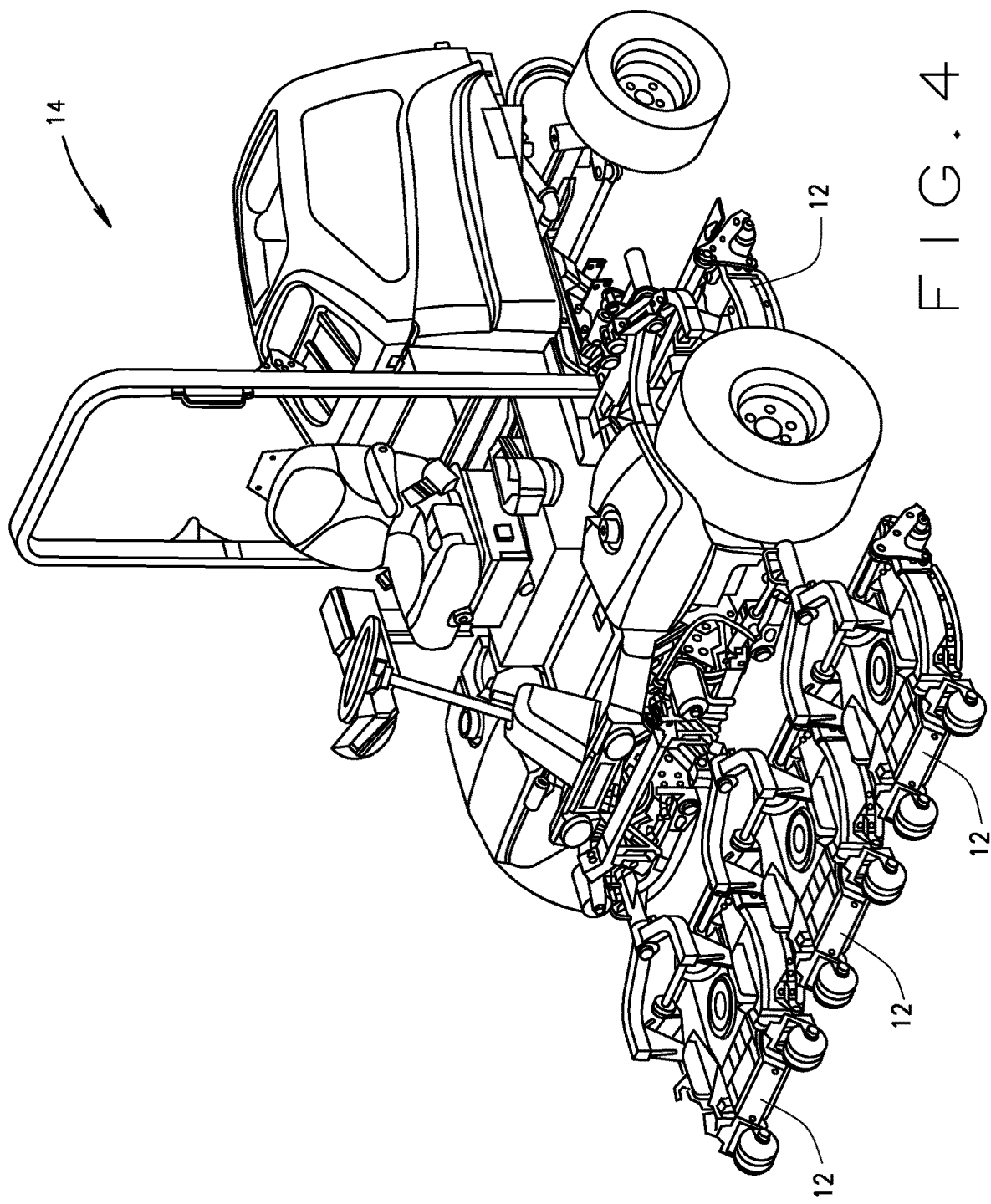
FIG. 4 is an exemplary illustration of the turf mower having the plurality of cutting implements thereof disposed in a lowered position and configured in a cutting mode in accordance with various embodiments of the present disclosure.

Referring to FIGS. 1 and 2, in various embodiments, the present disclosure generally provides an electro-hydraulic flow control (EHFC) system 10 for controlling the movement and disposition of one or more cutting implements 12 of a turf mower 14 (e.g., 1 to 12, or more cutting implements 12). For example, in various embodiment, the present disclosure generally provides an electro-hydraulic flow control system 10 that is structured and operable to raise the cutting implements 12 at a desired or first speed or movement rate to a non-cutting/transport position (as shown in FIG. 3), deploy or lower the cutting implements 12 at a second speed or movement rate to a cutting position (as shown in FIG. 4), and allow the cutting implements to 'float' while disposed in the cutting position and operating to cut turf (e.g., grass, weeds, etc.) over terrain that can be flat, even, uneven, undulating and/or contoured. In various embodiments, the first speed is greater or faster than the second speed. Alternatively, in various instances, the first speed can be lesser or slower than the second speed, or substantially equal to the second speed. As used herein, allowing the cutting implements 12 to 'float' will be understood to mean that when the cutting implements 12 are deployed in the cutting position and operating to cut turf, the EHFC system 10 is configured to allow the weight and force of gravity on the cutting implements to maintain the cutting implements 12 in contact with the ground, and to control movement the cutting implements 12 such that the cutting implements 12 can quickly move in response to the contour of the terrain over which the turf mower 14 and cutting implements 12 are traversing (i.e., can quickly raise, lift, lower, fall, tilt, cant, pitch, yaw, roll, etc., in accordance with the contour of the terrain over which the turf mower 14 and cutting implements 12 are traversing). Allowing the cutting implements 12 to float as disclosed herein results the turf mower 14 and the cutting implements 12 providing an even, uniform turf height cut.

The turf mower 14 generally includes the EHFC system 10, an internal combustion engine (ICE) 26, a radiator 22, a radiator fan 24 and a fan motor 20. It is envisioned that in various embodiment the turf mower 14 can be an electric powered turf mower wherein the turf mower 14 comprises an electric motor that is structured and operable to provide motive force to the turf mower 14 The ICE 26 provides motive force to one or more wheels 42, via a mechanical, hydraulic or electric drivetrain. The motive force is utilized to propel the mower 14 across a terrain or a ground surface (e.g., golf course greens, collars, tee-boxes, approaches, fairways, roughs, parks, other turfgrass, etc.) for cutting the turf (e.g., grass, weeds etc.) of the respective ground surface, via the cutting implements 14. As is well known such terrain or ground surfaces can be that can be flat, even, uneven, undulating and/or contoured. The radiator 22, radiator fan 24 and fan motor 20 are structured and operable to cool the ICE 26 and/or hydraulic fluid tank 30. Although, as described above, the turf mower 14 comprises one or more cutting implements 12 (e.g., one to twelve, or more cutting implements 12), the turf mower 14 and EHFC system 10 will be exemplarily described and illustrated herein with regard to the turf mower 14 comprising five cutting implements 12. Specifically, the turf mower 14 and EHFC system 10 will be exemplarily described and illustrated herein with regard to the turf mower 14 comprising a left rear (LR) cutting implement 12, a right rear (RR) cutting implement 12, a left front (LF) cutting implement 12, a right front (RF) cutting implement 12, and a center front (CTR) cutting implement 12.

The EHFC system 10 comprises a hydraulic system 32 and an electromechanical fluid flow control system 28 that is structured and operable to control the flow of hydraulic fluid through the hydraulic system 32 as described further below. The hydraulic system 32 comprises the hydraulic fluid tank 30 that is structured and operable to retain hydraulic fluid and is fluidly connected to a hydraulic pump 34, which is fluidly connected via a plurality of hydraulic fluid lines 38 (e.g., hydraulic conduits, hoses and/or tubes) to a plurality of hydraulic actuators 36. The hydraulic actuators 36 are structured and operable, as controlled by the electromechanical fluid flow control system 28, to regulate the movement of the cutting implements 12. The electromechanical fluid flow control system 28 comprises a control module 18 that is communicatively (wired or wirelessly) to, and controls the operation of, a fluid routing valve 46 (e.g., a spool valve), a float valve 50, a weight transfer valve 54 and a weight transfer pressure adjustment valve (WTPA) 58. The control module 18 can be any computer-based module of turf mower 14 and/or the EHFC system 10. For example, the control module 18 can be part of an engine control unit (ECU) of the turf mower, or an independent module specific to the EHFC system 10. The electromechanical fluid flow control system 28 is structured and operable to control operation of the hydraulic system 32 (e.g., control the flow of hydraulic fluid through the hydraulic system 32) to regulate movement of the cutting implements 12 between a transport mode wherein the cutting implements 12 are raised and not in contact with the ground, a ground contact mode wherein the cutting implements 12 are lowered and placed in contact with the ground in a cutting position, and a cutting float mode wherein the cutting implements 12 are in contact with the ground operating to cut turf and allowed to float (i.e., quickly raise, lift, lower, fall, tilt, cant, pitch, yaw, roll, etc., in accordance with the contour of the terrain over which the turf mower 14 and cutting implements 12 are traversing).

The fluid routing valve 46, as controlled by the control module 18, controls the routing or path of the hydraulic fluid from and to the hydraulic fluid tank 30 through the electromechanical fluid flow control system 28. Particularly, in various instances of various embodiments, when disposed in a first position the fluid routing valve 46 receives the hydraulic fluid from the tank 30 via an electromechanical system input port P and routes the fluid directly back to the tank 30 via electromechanical system output port T and/or outlet port T1. However, when disposed in a second position the fluid routing valve 46 routes the hydraulic fluid from the tank 30 to the hydraulic actuators 36, and from the actuators 36 back to the tank 30. The float valve 50 is disposed between the routing valve 46 and the actuators 36 and is structured and operable to bi-directionally control the flow of hydraulic fluid therethrough. That is, the float valve 50 is structured and operable to control flow of the hydraulic fluid flowing therethrough from the tank 30 (via the pump 34 and routing valve 46) to the actuators 36, and the flow of the hydraulic fluid flowing therethrough from the actuators 36 back to the tank 30. Particularly, the float valve 50 is switchable, as controlled by the control module 18, between a check position and a control position. In the check position the float valve 50 functions a check valve where fluid is allowed to flow mono-directionally from routing valve 46 to the actuators 36 but prevented from flowing from the actuators 36 back to the tank 30. In various embodiments, when the float valve 50 is in the control position, the float valve 50 functions as an open valve and allows the hydraulic fluid to freely flow bidirectionally therethrough, while in other embodiments when in the control position the float valve 50 functions as a metering valve that meters, regulates or otherwise controls the volume, pressure and fluid flow rate of hydraulic fluid flowing therethrough. The weight transfer valve 54, as controlled by the control module 18, is switchable between a weight transfer position where fluid is allowed to mono-directionally flow therethrough from the actuators 36 to the WTPA valve 58, and a closed position where fluid is prevented from flowing therethrough in any direction. The WTPA valve 58 is disposed between the weight transfer valve 54 and the tank 30 and, as controlled by the control module 18, is structured and operable to meter, regulate or otherwise control the volume, pressure and fluid flow rate of hydraulic fluid therethrough, from the actuators 36 to the tank 30, when the weight transfer valve is in the weight transfer position.

The control module 18 can be any control module of the turf mower 14. For example, in various embodiments it can be a standalone module specifically programmed with one or more cutting implement mode control algorithm, program code and/or software (referred to herein as cutting implement mode control software) that is executable (via processor of the control module 18) to control the position (e.g., raised or lowered) and disposition mode (e.g., the transport mode, the ground contact mode, and the cutting float mode) of the cutting implements 12. Particularly, execution of the cutting implement mode control software controls operation of the EHFC 10, and more specifically the operations and functions of the fluid routing valve 46, the float valve 50, the weight transfer valve 54 and the WTPA valve 58 to control the position and disposition mode of the cutting implements 12, as described herein.

Alternatively, in various other embodiments, the control module 18 can be any computer-based module of the turf mower 14 that is programmed to control the operation of various other devices and systems of the mower 14 and programmed with the cutting implement mode control software to control the position and disposition mode of the cutting implements 12. For example, in various embodiments the control module 18 can be an engine control module (ECM) and/or a master control unit (MCU) of the turf mower 14 that is/are programmed, independently or in combination, to control various functions and operations of the ICE 26 and is also programmed with the cutting implement mode control software. In various other embodiments, it is envisioned that the control module 18 can be a hardware-based module that is structured and operable to implement the cutting implement mode control software functionality as described herein. For example, it is envisioned that the control module 18 can comprise one or more, or be part of, application specific integrated circuit(s) (e.g., ASIC(s)), combinational logic circuit(s); field programmable gate array(s) (FPGA); processor(s) (shared, dedicated, or group) that execute the cutting implement mode control software; and/or other suitable hardware components that provide the functionality described herein; or a combination of some or all of the above, such as in a system-on-chip, and remain within the scope of the present disclosure.

It should be understood that although the control module 18 is sometimes described herein as directly controlling the various automated, or robotic, operations of the EHFC system 10, it is the execution of the cutting implement mode control software by at least one processor of the control module 18, in various instances using inputs from a user interface, various electronically stored data tables, databases, lookup tables, etc., and/or various other components, sensors, systems and assemblies of the turf mower 14 that actually control the various automated, or robotic, operations of the EHFC system 10 described herein. Additionally, in various instances the control module 18 may indirectly perform and/or control performance of such operations and functionality of the EHFC 10 by generating commands and control signals that can cause other elements to carry out the control operations and functionality of the EHFC system 10 described herein. Or, in the various hardware embodiments, it is the operation of the various control module 18 hardware components that can generate the cutting implement position and disposition mode control commands that are then output by the control module 18 to control the operations and functions of the EHFC system 10, as described herein.

As described above, the EHFC system 10 is structured and operable to, via execution of the cutting implement mode control software, lift the cutting implements 12 to the raised position at a desired or first speed (placing the cutting implements 12 in the transport mode), deploy or lower the cutting implements 12 to the ground contact/cutting position (placing the cutting implements 12 in the ground contact mode) at a second speed, and place the cutting implements 12 in the float mode while disposed in the cutting position and operating to cut turf (e.g., grass, weeds, etc.) over terrain that can be flat, even, uneven, undulating and/or contoured. As also described above, in various embodiments, execution of the cutting implement mode control software can operate the electromechanical fluid flow control system 28 such that the cutting implements 12 are lifted to the raised position quickly, but are lowered to the cutting position more slowly such that the cutting implements 12 softly contact the ground and do not mar or scuff the ground or make indentations in the ground. As still further described above, implementation of the float mode, via execution of the cutting implement mode control software, controls the function of the electromechanical fluid flow control system 28, which in turn controls operation of the actuators 36 such that the cutting implements 12 can quickly move in response to the contour of the terrain over which the turf mower 14 and cutting implements 12 are traversing (i.e., can quickly raise, lift, lower, fall, tilt, cant, pitch, yaw, roll, etc., in accordance with the contour of the terrain over which the turf mower 14 and cutting implements 12 are traversing) thereby providing an even, uniform turf height cut.

Referring now to FIGS. 5 through 9, in various embodiments the float valve 50 can be a simple poppet valve. The various configurations of the EHFC system 10, particularly of the electromechanical fluid flow control system 28, for implementing the various states, positions and modes of the cutting implements 12, wherein the float valve 50 is a poppet valve, will now be described.

Figure 5:
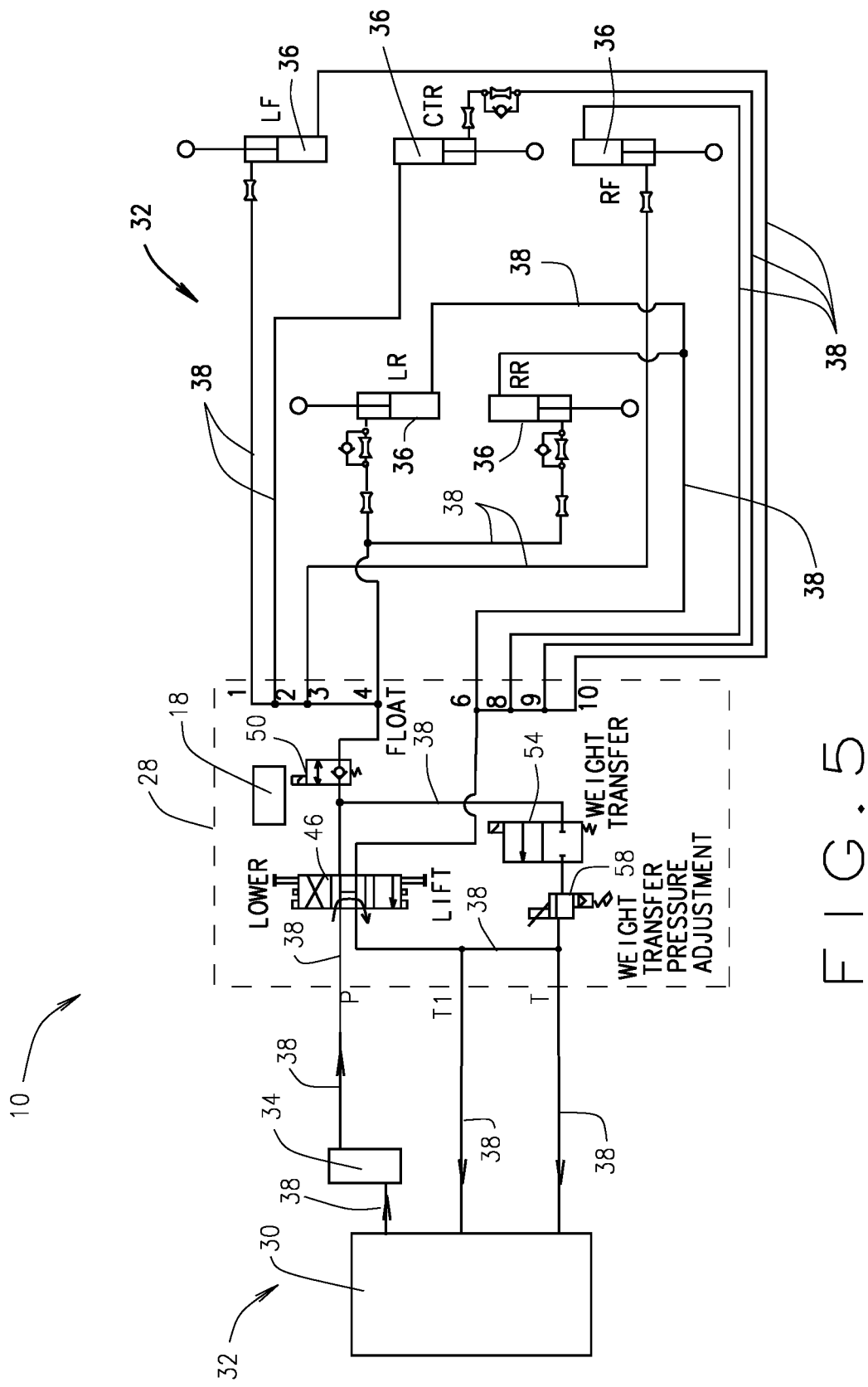
FIG. 5 is an exemplary schematic of the EHFC system wherein an electromechanical system thereof comprises a poppet type float valve, and wherein the electromechanical system is configured in a neutral state in accordance with various embodiments of the present disclosure.

FIG. 5 exemplarily illustrates the electromechanical fluid flow control system 28 configured to implement a neutral state of the EHFC system 10, in accordance with various embodiments. The neutral state refers to an initial condition when the turf mower 14, specifically the ICE 26, is started and hydraulic fluid begins to flow, via the pump 34, from the tank 30 into inlet port P of the electromechanical fluid flow control system 28 and exit the electromechanical fluid flow control system 28 at outlet ports T & T1 without doing any work. More specifically, when in the neutral state the control module 18 (via execution of the cutting implement mode control software) places the fluid routing valve 46 in the first position. In this configuration the hydraulic fluid is pumped from the tank 30 into the fluid routing valve 46, whereby the fluid routing valve 46 routes the hydraulic fluid directly back to the tank 30, hence the actuators 36 are de-energized and no work is done on the actuators 36. Additionally, the control module 18 places the float valve 50 in the check position wherein in float valve functions a check valve such that fluid from the actuators 36 is prevented from flowing back to the tanks 30 such that the actuators 36 will remain held in their present positions.

Figure 6:
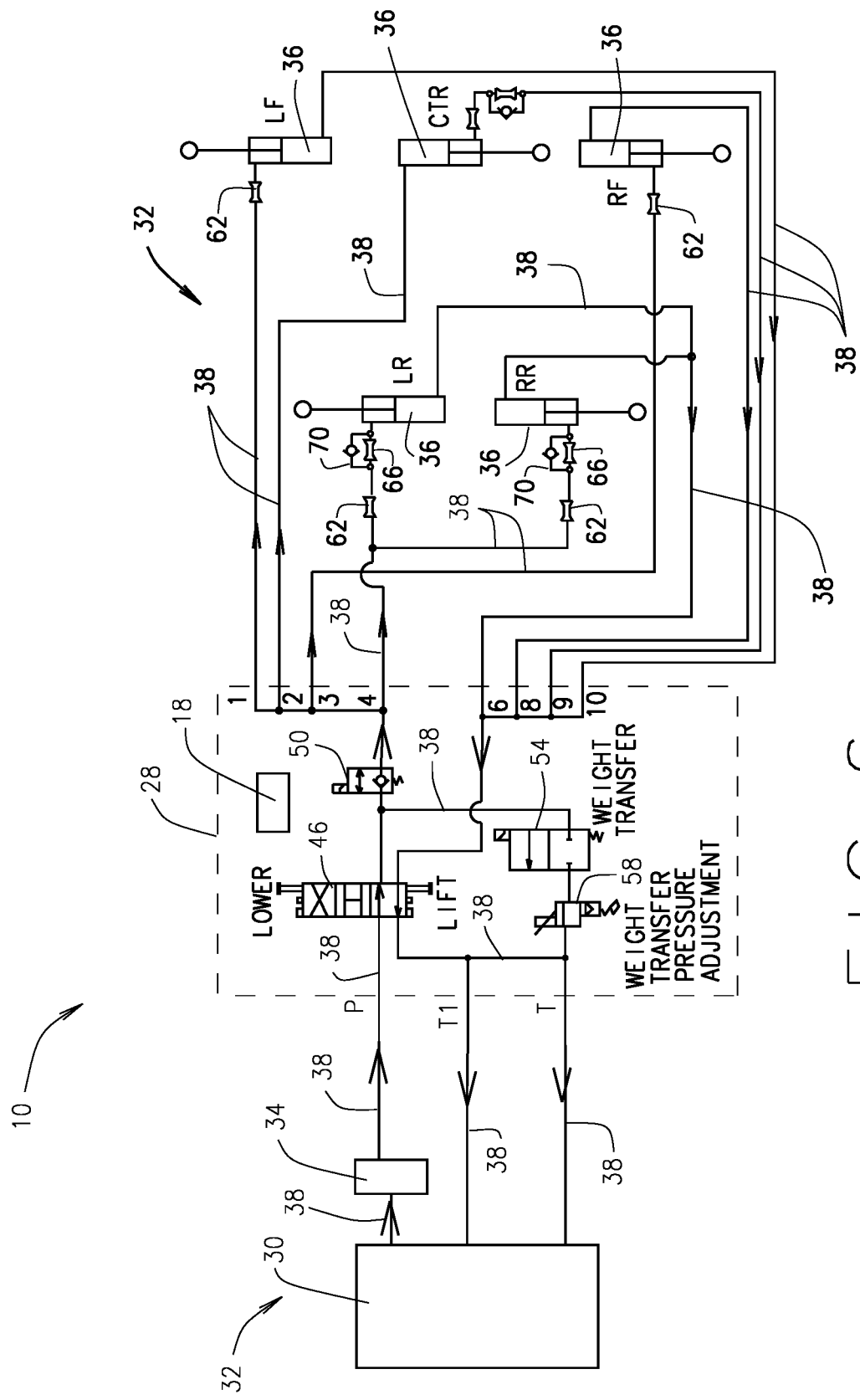
FIG. 6 is an exemplary schematic of the EHFC system wherein the electromechanical system thereof comprises the poppet type float valve, and wherein the electromechanical system is configured in a lifting state in accordance with various embodiments of the present disclosure.

FIG. 6 exemplarily illustrates the electromechanical fluid flow control system 28 configured to implement a lifting state of the EHFC system 10, in accordance with various embodiments. The lifting state refers to lifting of the cutting implements 12 to the raised position and placed or configured in the transport mode. When in the lifting state, the control module 18 (via execution of the cutting implement mode control software) places the fluid routing valve 46 in the second position, the float valve 50 in the check position and the weight transfer valve 54 in the closed position. In the second position, the fluid routing valve 46 allows hydraulic fluid to flow from the tank 30 to the float valve 50, and hydraulic fluid to flow from the actuators 36 back to the tank 30. In the check position, the float valve 50 allows monodirectional hydraulic fluid flow therethrough from the tank 30 to the actuators 36. Particularly, when in the check position, the float valve 50 allows fluid flowing through the routing valve 46 from the tank 30 to flow to the actuators 36 but will prevent fluid from flowing from the actuators 36 back through the float valve 50 toward the tank 30. In the closed position, the weight transfer valve 54 prevents fluid flowing through the routing valve 46 from flowing directly back to the tank 30 and forces the fluid to flow through the float valve 50 to the actuators 36.

As illustrated in the various figures, in various embodiments the hydraulic system 32 can further comprise a first orifice disc or plate 62 in-line prior to one or more of the actuator 36 (i.e., between the tank 30 and a pump-side fluid inlet/outlet of the actuator 36) or subsequent to one or more of the actuator 36 (i.e., between a tank-side fluid inlet/outlet of the actuator 36 and the tank 30). The pump-side fluid inlet/outlet of the actuators 36 is the inlet/outlet of the actuators 36 fluidly connected, via the fluid lines 38, to the pump 34 through the float and routing valves 50 and 46, and the tank-side fluid inlet/outlet of the actuators 36 is the inlet/outlet of the actuators 36 fluidly connected, via the fluid lines 38, to the tank 30 through the routing valve 46. And, in various embodiments, the hydraulic system 32 can additionally comprise a second orifice disc or plate 66 in-line prior to, or subsequent to, one or more of the actuators 36. The first orifice disc 62 and second orifice plate 66 comprise inserts (e.g., discs or plates) having an orifice, hole or other type of passageway therethrough. The orifice, hole or passageway has a desired size and structure (e.g., diameter) through which the hydraulic fluid must flow. Particularly, the first orifice disc 62 and the second orifice plate 66 are structured and operable to narrow the hydraulic fluid flow path, and thereby increase the hydraulic fluid pressure within the fluid lines 38 and restrict, reduce or slow the flow rate to and/or from the respective cutting implement actuator 36 to thereby restrict, reduce or slow the rate or speed of actuation and/or de-actuation of the hydraulic actuators 36, to thereby restrict, reduce or slow the rate or speed of raising and/or lowering of the cutting implements 12. Accordingly, based on the size and structure (e.g., diameter) of the orifice, hole or passageway in each respective first orifice disc 62 and/or the second orifice plate 66 the first orifice disc 62 and/or the second orifice plate 66 can be structured and operable to control the rate or speed of actuation and/or de-actuation of the actuators 36, and hence the rate or speed of the lifting and/or lowering of the cutting implements 12.

With further reference to FIG. 6, in operation, when the electromechanical fluid flow control system 28 is configured to implement a lifting state of the EHFC system 10, the hydraulic fluid is pumped from the tank 30 by the pump 34 and flows, via the hydraulic lines 38, to and through the routing valve 46. After passing through the routing valve 46 the fluid flows, via the hydraulic lines 38, to and through the float valve 50. After passing through the float valve 50 the fluid flows, via the hydraulic lines 38, to and through the first orifice discs 62 disposed prior to one or more of the actuators 36. Thereafter, in various instances (e.g., with regard to the left rear and right rear cutting implement actuators 36) the fluid, bypasses the second orifice plates 66, via a check valve bypass loop 70. Thereafter, the fluid enters the actuators 36 expanding or extending the actuators 36 (e.g., pushing the actuator piston and piston rod outward) and lifting the cutting implements 12 at a desired rate or speed based on the size and structure of the orifice, hole or other type of passageway through the first orifice disc 62 and/or the second orifice plate 66. For example, in various embodiments wherein various actuators 36 have the first orifice disc 62 disposed prior thereto, the desired rate or speed of lifting the cutting implements 12 is stipulated and controlled by the first orifice plates 62 (e.g., based on the size and structure (e.g., diameter) of the orifice, hole or passageway of the first orifice plates 62. In various embodiments, the orifice, hole or passageway of the first orifice plates 62 can have a diameter of 0.020 inches to 0.065 inches (e.g., 0.029 inches to 0.055 inches).

Figure 7:
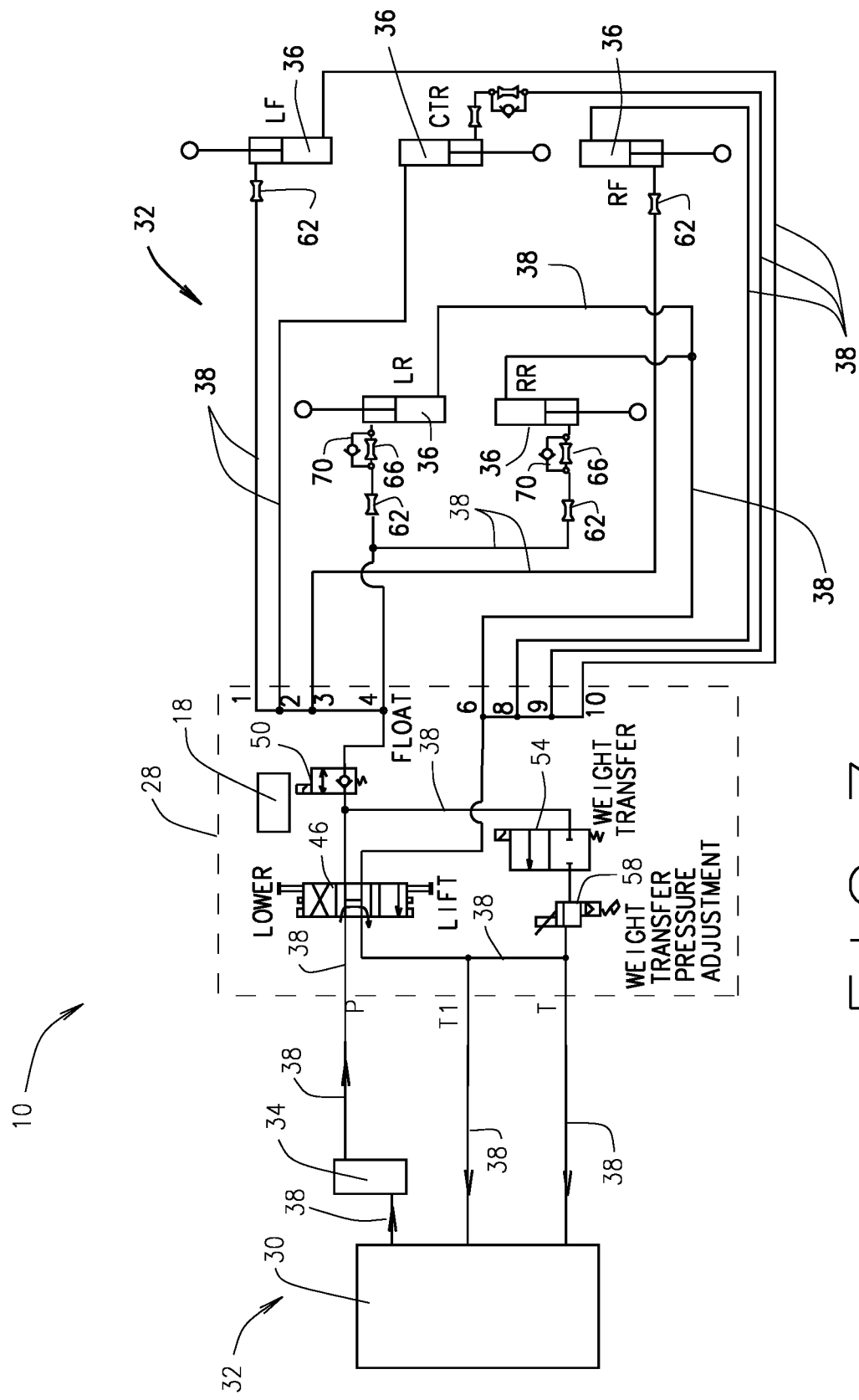
FIG. 7 is an exemplary schematic of the EHFC system wherein the electromechanical system thereof comprises the poppet type float valve, and wherein the electromechanical system is configured in a holding state in accordance with various embodiments of the present disclosure.

Referring now to FIG. 7, once the cutting implements have been raised and placed in the transport mode, or lowered and placed in the cutting mode, the electromechanical fluid flow control system 28 can be configured to implement a holding state of the EHFC system 10, in accordance with various embodiments. The holding state is very similar to the neutral state described above. When in the holding state, the control module 18 (via execution of the cutting implement mode control software) places the fluid routing valve 46 in the first position, the float valve 50 in the check position and the weight transfer valve 54 in the closed position. When the fluid routing valve 46 is in the first position, the hydraulic fluid pumped from the tank 30 into the fluid routing valve 46, via the hydraulic lines 38, is routed directly back to the tank 30, via the hydraulic lines 38. As described above, the float valve 50 allows monodirectional hydraulic fluid flow therethrough such that fluid is allowed to flow from the tank 30 to the actuators 36 but is prevented from flowing from the actuators 36 back through the float valve 50 toward the tank 30. Particularly, when in the check position the float valve 50 prevents fluid from flowing from the actuators 36 back through the float valve 50 toward the tank 30 so that the weight of the cutting implements 12 and the force of gravity on the cutting implements 12 cannot force fluid from the actuators 36 back through the fluid lines 38 to the tank 30. Hence, the cutting implements 12 are prevented from lowering via their weight and the force of gravity and are held in the raised position/transport mode, or the lowered position/cutting mode.

Figure 8:
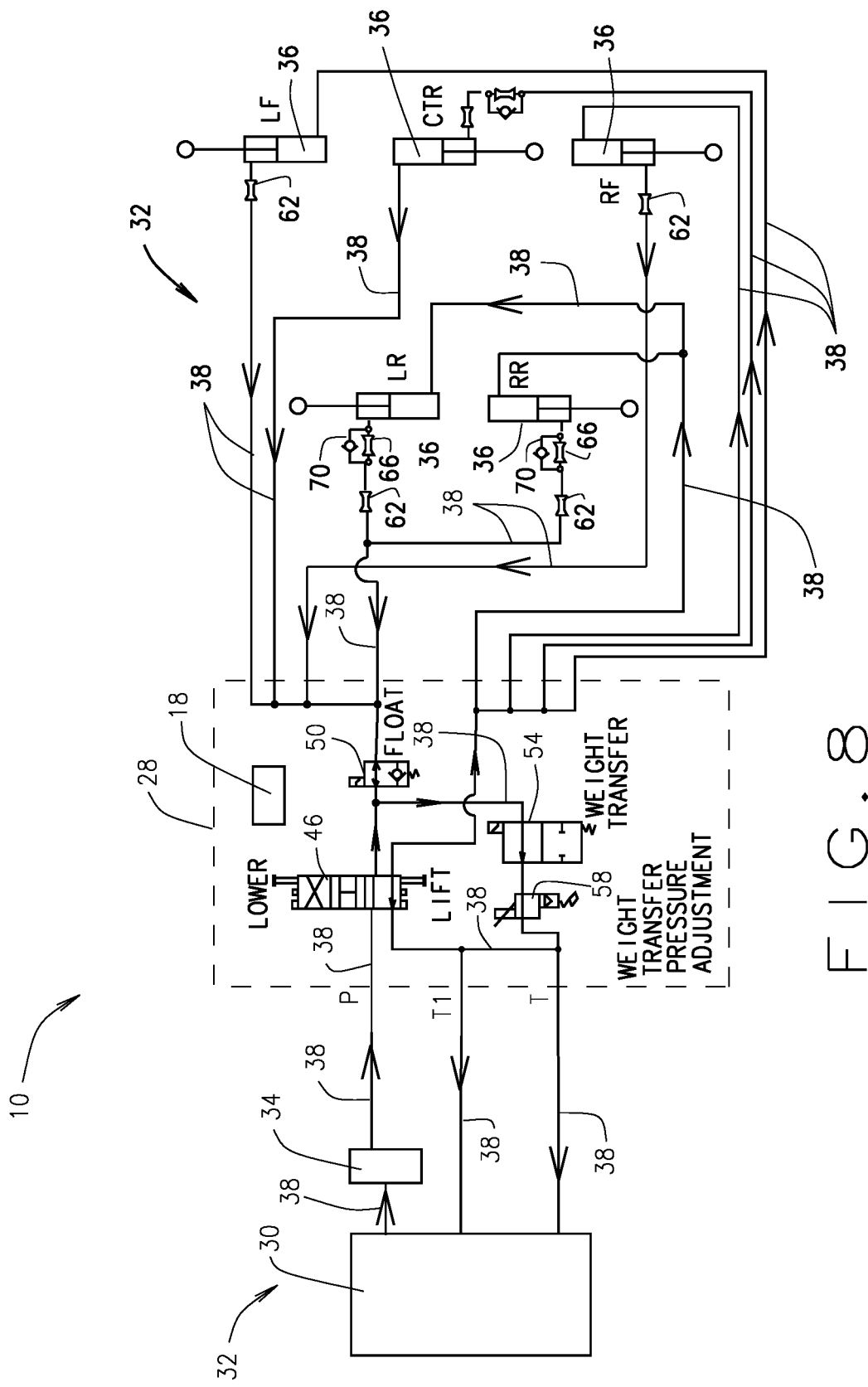
FIG. 8 is an exemplary schematic of the EHFC system wherein the electromechanical system thereof comprises the poppet type float valve, and wherein the electromechanical system is configured in a lowering state in accordance with various embodiments of the present disclosure.

FIG. 8 exemplarily illustrates the electromechanical fluid flow control system 28 configured to implement a lowering state of the EHFC system 10 whereby the cutting implements 12 are lowered and placed or configured in the cutting mode, in accordance with various embodiments. When in the lowering state, the control module 18 (via execution of the cutting implement mode control software) places the fluid routing valve 46 in the second position, the float valve 50 in the open/control position and the weight transfer valve 54 in the weight transfer position. In the second position, the fluid routing valve 46 allows hydraulic fluid to flow from the tank 30 to the float valve 50, and hydraulic fluid to flow from the actuators 36 back to the tank 30. The float valve 50, when in the open/control position allows bi-directional hydraulic fluid flow therethrough from the tank 30 to the actuators 36 and from the actuators 36 to the tank 30. In the open position, the weight transfer valve 54 allows fluid flowing through the routing valve 46 and fluid flowing from the actuators 36 to flow therethrough to the WTPA valve 58 and back to the tank 30. However, as described below, the WTPA valve is electrically operated and controlled by the control module 18 to control the pressure and rate of fluid flowing therethrough to control the rate or speed at which the cutting implements 12 are lowered to the ground (i.e., a decent rate of the cutting implements 12).

In operation, when the electromechanical fluid flow control system 28 is configured to implement a lowering state of the EHFC system 10, the hydraulic fluid is pumped from the tank 30 by the pump 34 and flows, via the hydraulic lines 38, to and through the routing valve 46. Simultaneously, with the float valve 50 in the open/control position, the weight of the cutting implements 12 and the force of gravity on the cutting implements 12 can force the fluid out of the actuators 36 generating a fluid flow back to and through the float valve 50. The fluid flowing from the tank 30 and the fluid flowing from the actuators 36 converge and merge at a weight transfer junction (WTJ) of the fluid lines 38 between the fluid routing valve 46 and the float valve 50. The fluid flowing from the tank 30 causes a back pressure on the fluid flowing from the actuators 36 that increases the pressure within the fluid lines 38 and causes a slowing of the flow rate and from the actuators 36. At the weight transfer junction WTJ of the fluid lines 38 the merged fluid from the tank 30 and from the actuators 36 is directed to and through the weight transfer valve 54.

Thereafter, the merged fluid passing through the weight transfer valve 54 enters the WTPA valve 58. As described above, operation of the WTPA valve 58 is controlled by the control module 18 in accordance with the execution of the cutting implement mode control software. For example, the WTPA valve 58 is controlled via execution of a weight transfer function of the cutting implement mode control software (e.g., a pulse-width-modulation function). Specifically, the control module 18 controls the WTPA valve 58 such that the pressure and flow rate of the merged fluid from the weight transfer valve 54 is metered or controlled. More specifically, the control module 18 controls the operation of the WTPA valve 58 such that the merged fluid pressure and flow rate (i.e., pressure and flow rate of the fluid from the tank 30 merged with fluid from the actuators 36) is regulated, metered, modulated or otherwise controlled, thereby regulating, metering, modulating or otherwise controlling the speed at which the cutting implements 12 are lowered to the ground (i.e., controlling a decent rate of the cutting implements 12). Hence, lowering of the cutting implements 12 can be controlled to have a decent rate whereby the cutting implements 12 contact the ground without making impressions or indentations in, or otherwise damaging, the ground.

In various embodiments wherein the hydraulic system 32 includes the first orifice disc 62 and/or the second orifice plate 66, the pressure and flow rate of the fluid flowing from the actuators 36 is further regulated by the first orifice disc 62 and/or second orifice plate 66 to further control the speed at which the cutting implements 12 are lowered to the ground (i.e., further control the decent rate of the cutting implements 12). For example, in various embodiments wherein the first orifice disc 62 and/or second orifice plate 66 is/are disposed prior to the pump-side inlet/outlet of one or more actuator 36, the fluid will flow through the first orifice disc and/or the second orifice plate 66 whereby the pressure and flow rate is controlled by the size and structure (e.g., diameter) of the orifice(s) in the first orifice disc and/or the second orifice plate 66, as described above.

Figure 9:
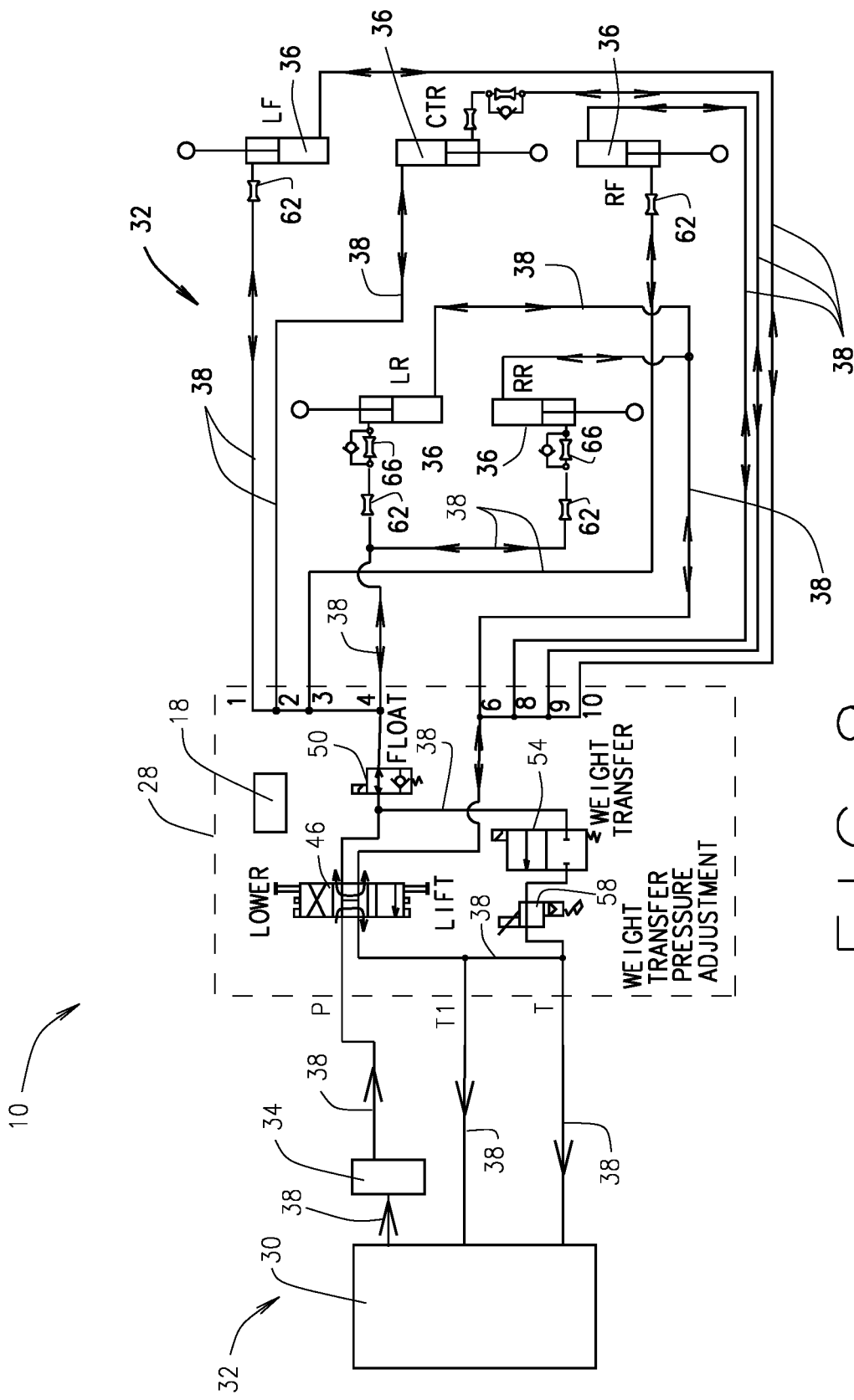
FIG. 9 is an exemplary schematic of the EHFC system wherein the electromechanical system thereof comprises the poppet type float valve, and wherein the electromechanical system is configured in a floating state in accordance with various embodiments of the present disclosure.

FIG. 9 exemplarily illustrates the electromechanical fluid flow control system 28 configured to implement a floating state of the EHFC system 10 whereby the cutting implements 12 are allowed to 'float' across the contour of the terrain over which the turf mower 14 and cutting implements 12 are traversing, in accordance with various embodiments. That is, the EHFC system 10 is configured to control movement the cutting implements 12 such that the cutting implements 12 can quickly move in response to the contour of the terrain over which the turf mower 14 and cutting implements 12 are traversing (i.e., can quickly raise, lift, lower, fall, tilt, cant, pitch, yaw, roll, etc., in accordance with the contour of the terrain over which the turf mower 14 and cutting implements 12 are traversing). When in the floating state, the control module 18 (via execution of the cutting implement mode control software) places the fluid routing valve 46 in the first position, the float valve 50 in the open/control position and the weight transfer valve 54 in the closed position. When the fluid routing valve 46 is in the first position, the hydraulic fluid pumped from the tank 30 into the fluid routing valve 46, via the hydraulic lines 38, is routed directly back to the tank 30 and does no work on the hydraulic system 32. When in the open/control position, the float valve 50, allows hydraulic fluid to bidirectionally flow therethrough to and from the actuators 36.

Additionally, with the weight transfer valve 54 in the closed position no fluid is allowed to flow through the weight transfer valve 54. Therefore, the actuators 36 are isolated, and the fluid is forced to bi-directionally circulate back and forth to and from the actuators 36 through the routing valve 46 and the float valve 50 due to up and down movement of the cutting implements 12 as they traverse the uneven or undulating ground surface. Particularly, the portion of the hydraulic system 32 comprising the actuators 36 is communicatively (i.e., fluid communication of hydraulic fluid) isolated from the portion of the hydraulic system comprising the tank 30 and pump 34 via the electromechanical system 28, particularly via the routing valve 46 and the weight transfer valve 54. Therefore, with the routing valve 46 and the weight transfer valve 54 in the first position and the closed position, respectively, fluid from the actuators passing through the float valve 50 in either direction will be routed back to the opposite ends of the actuators 36. More specifically, the fluid is allowed to flow to and from the actuators without the pressure and flow rate being controlled by the electromechanical system 28. Accordingly, the movement of actuators 36 is generated only by the movement of the cutting implements 12 in response to the contour of the terrain over which the turf mower 14 and cutting implements 12 are traversing. That is the movement of actuators 36 is generated only by the movement of the cutting implements 12 as the cutting implements 12 move across the ground and raise, lift, lower, fall, tilt, cant, pitch, yaw, roll, etc., in accordance with the contour of the ground surface. More particularly, the cutting implements 12 are allowed to float across the ground. That is, the cutting implements 12 are allowed to quickly move in response to the contour of the terrain over which the turf mower 14 and cutting implements 12 are traversing (i.e., quickly raise, lift, lower, fall, tilt, cant, pitch, yaw, roll, etc., in accordance with the contour of the terrain over which the turf mower 14 and cutting implements 12 are traversing), thereby providing an even, uniform turf height cut. Hence, when in the EHFC system 10 is in the float configuration, the pressure and flow control of the hydraulic fluid within the hydraulic lines 38 flowing to and from the actuators 36 is electronically eliminated the to enable unrestricted float of the cutting implements 12 and improved ground contour following capability of the cutting implements 12.

Figure 10:
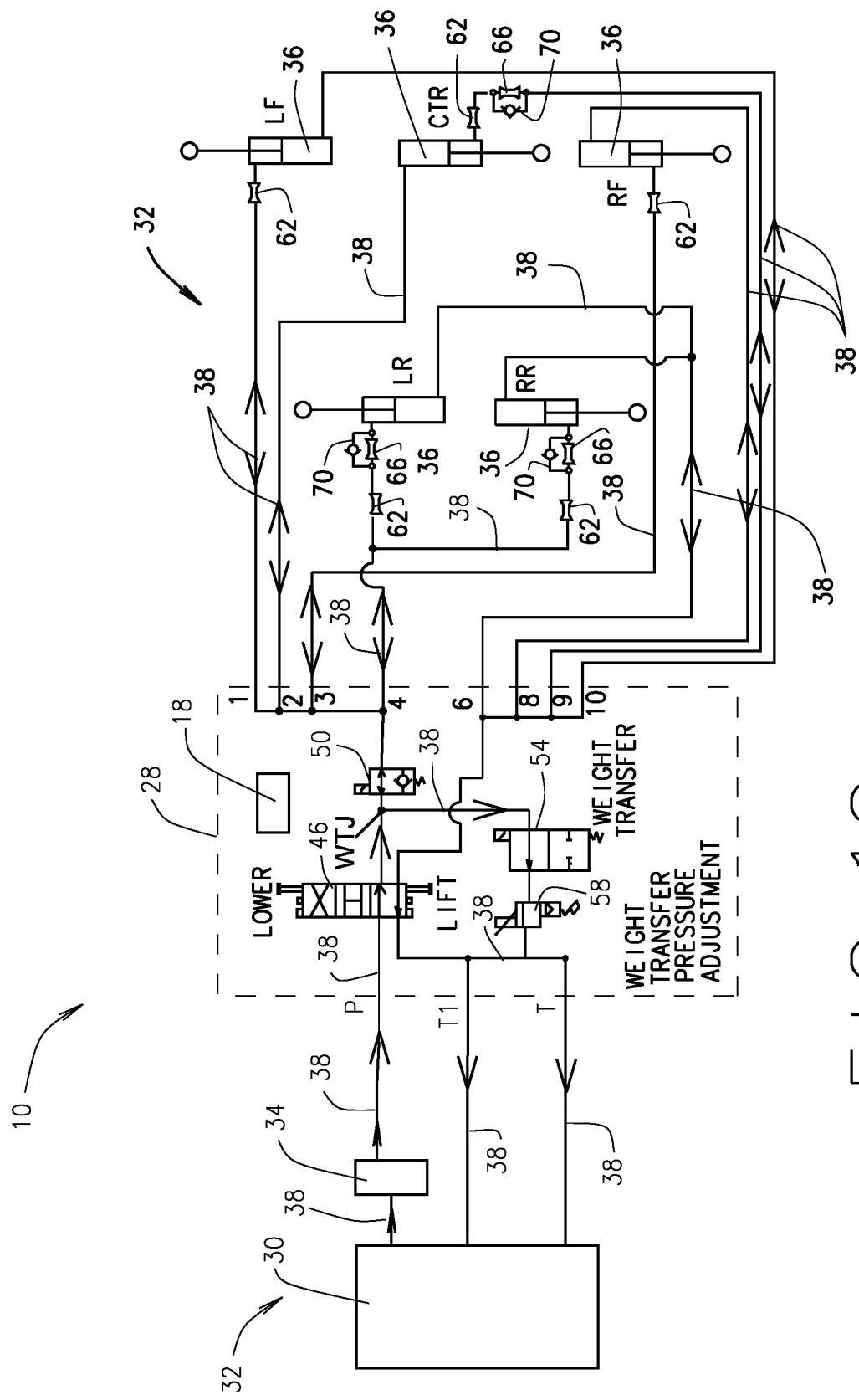
FIG. 10 is an exemplary schematic of the EHFC system wherein the electromechanical system thereof comprises the poppet type float valve, and wherein the electromechanical system is configured in a weight transfer state in accordance with various embodiments of the present disclosure.

FIG. 10 exemplarily illustrates the electromechanical fluid flow control system 28 configured to implement a weight transfer state of the EHFC system 10, in accordance with various embodiments. When in the weight transfer state, the control module 18 (via execution of the cutting implement mode control software) places the fluid routing valve 46 in the second position, the float valve 50 in the open/control position and the weight transfer valve 54 in the weight transfer position. In the second position, the fluid routing valve 46 allows hydraulic fluid to flow from the tank 30 to the float valve 50, and hydraulic fluid to flow from the actuators 36 back to the tank 30. The float valve 50, when in the open/control position allows bi-directional hydraulic fluid flow therethrough from the tank 30 to the actuators 36 and from the actuators 36 to the tank 30. In the open position, the weight transfer valve 54 allows fluid flowing through the routing valve 46 and fluid flowing from the actuators 36 to flow therethrough to the WTPA valve 58 and back to the tank 30. However, the WTPA valve 58 is electrically operated and controlled by the control module 18 to control the pressure and rate of fluid flowing therethrough to control the pressure the cutting implements 12 exert on the ground when in the lowered position/cutting mode.

In operation, when the electromechanical fluid flow control system 28 is configured to implement a weight transfer state of the EHFC system 10, the hydraulic fluid is pumped from the tank 30 by the pump 34 and flows, via the hydraulic lines 38, to and through the routing valve 46. Simultaneously, with the float valve 50 in the open/control position, the weight of the cutting implements 12 and the force of gravity on the cutting implements 12 forces fluid out of the actuators 36 generating a fluid flow back to and through the float valve 50. The fluid flowing from the tank 30 and the fluid flowing from the actuators 36 converge and merge at the weight transfer junction WTJ of the fluid lines 38 between the fluid routing valve 46 and the float valve 50. The fluid flowing from the tank 30 causes a back pressure on the fluid flowing from the actuators 36 that increases the pressure within the fluid lines 38 and causes a reduction in the effective weight of the cutting implements 12 (e.g., a slowing of the flow rate and from the actuators 36). At the weight transfer junction WTJ of the fluid lines 38 the merged fluid from the tank 30 and from the actuators 36 is directed to and through the weight transfer valve 54. Thereafter, the merged fluid passing through the weight transfer valve 54 enters the WTPA valve 58. As described above, operation of the WTPA valve 58 is controlled by the control module 18 in accordance with the execution of the cutting implement mode control software. For example, the WTPA valve 58 is controlled via execution of a weight transfer function of the cutting implement mode control software (e.g., a pulse-width-modulation function). Specifically, the control module 18 controls the WTPA valve 58 such that the pressure and flow rate of the merged fluid from the weight transfer valve 54 is metered or controlled. More specifically, the control module 18 controls the operation of the WTPA valve 58 such that the merged fluid pressure and flow rate (i.e., pressure and flow rate of the fluid from the tank 30 merged with fluid from the actuators 36) is regulated, metered, modulated or otherwise controlled, thereby regulating, metering, modulating or otherwise controlling the force the cutting implements 12 exert on the ground when in the lowered position/cutting mode.

The weight transfer state is a state that is entered after the cutting implements 12 have been lowered to the lowered position/cutting mode, as described above. In various embodiments, the weight transfer state is automatically implemented upon engaging the cutting mode. When in the weight transfer state, hydraulic fluid flows through the routing valve 46, through the weight transfer valve 54, and is metered or controlled by the WTPA 58 and flows back to tank 30. This creates a back pressure, as described above, to bias the weight of the cutting implements 12, effectively making them lighter and transferring more of the turf mower 14 weight back onto the traction wheels 42. Without weight transfer state, the downward pressure on the cutting implements 12 due to the force of gravity would be borne by the cutting implements 12 themselves, resulting in less turf mower 14 weight being applied to the ground contact areas of the traction wheels 42 and less available traction for the turf mower 14. Biasing the weight of the cutting implements 12 to be lighter transfers some of the weight of the cutting implements 12 back through the cutting implement lift arms, through the turf mower frame, and to the traction wheels 14, thereby improving traction. Note that the cutting implements 12 are not lifted off the ground in weight transfer mode. However, the weight transfer mode does effectively make the cutting implements 12 lighter and the weight of the turf mower heavier on the traction wheels 14.

Referring now to FIGS. 11 through 16, in various embodiments the float valve 50 can be a proportional flow control valve that is structured and operable, a controlled by the control module 18, to meter or control pressure and flow rate of the hydraulic fluid to and from the actuators 36. The various configurations of the EHFC system 10, particularly of the electromechanical system 28, for implementing the various states, positions and modes of the cutting implements 12, wherein the float valve 50 is a proportional flow control valve, will now be described.

Figure 11:
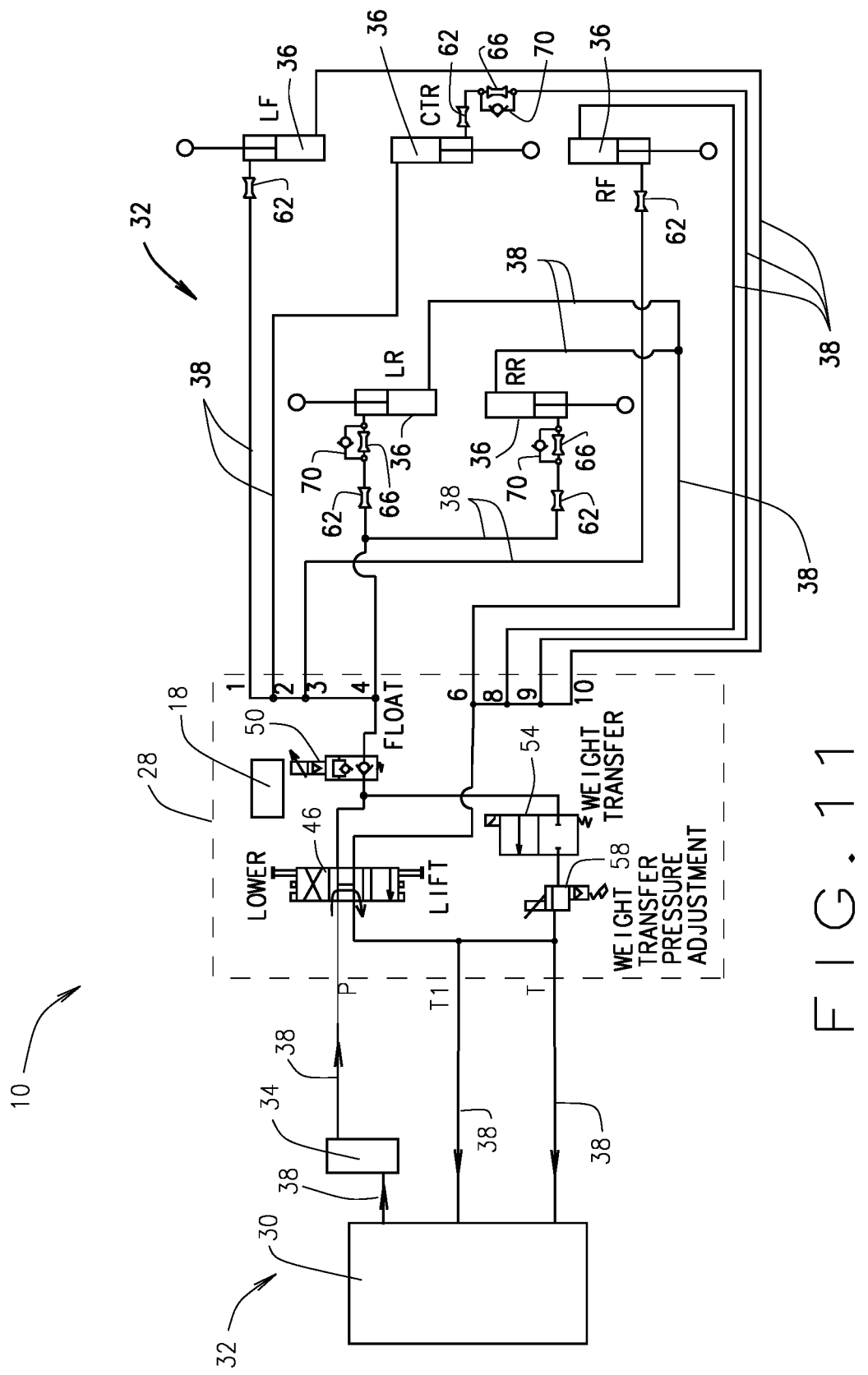
FIG. 11 is an exemplary schematic of the EHFC system wherein the electromechanical system thereof comprises a proportional flow control float valve float valve, and wherein the electromechanical system is configured in a neutral state in accordance with various embodiments of the present disclosure.

FIG. 11 exemplarily illustrates the electromechanical fluid flow control system 28 configured to implement a neutral state of the EHFC system 10, in accordance with various embodiments wherein the float valve 50 can be a proportional flow control valve. As described above, the neutral state refers to an initial condition when the turf mower 14, specifically the ICE 26, is started and hydraulic fluid begins to flow, via the pump 34, from the tank 30 into inlet port P of the electromechanical fluid flow control system 28 and exit the electromechanical fluid flow control system 28 at outlet ports T & T1 without doing any work. More specifically, when in the neutral state the control module 18 (via execution of the cutting implement mode control software) places the fluid routing valve 46 in the first position. In this configuration the hydraulic fluid is pumped from the tank 30 into the fluid routing valve 46, whereby the fluid routing valve 46 routes the hydraulic fluid directly back to the tank 30, hence the actuators 36 are de-energized and no work is done on the actuators 36. Additionally, the control module 18 places the float valve 50 in the check position wherein the float valve 50 functions as a check valve such that fluid from the actuators 36 is prevented from flowing back to the tanks 30 so that the actuators 36 will remain held in their present positions.

Figure 12:
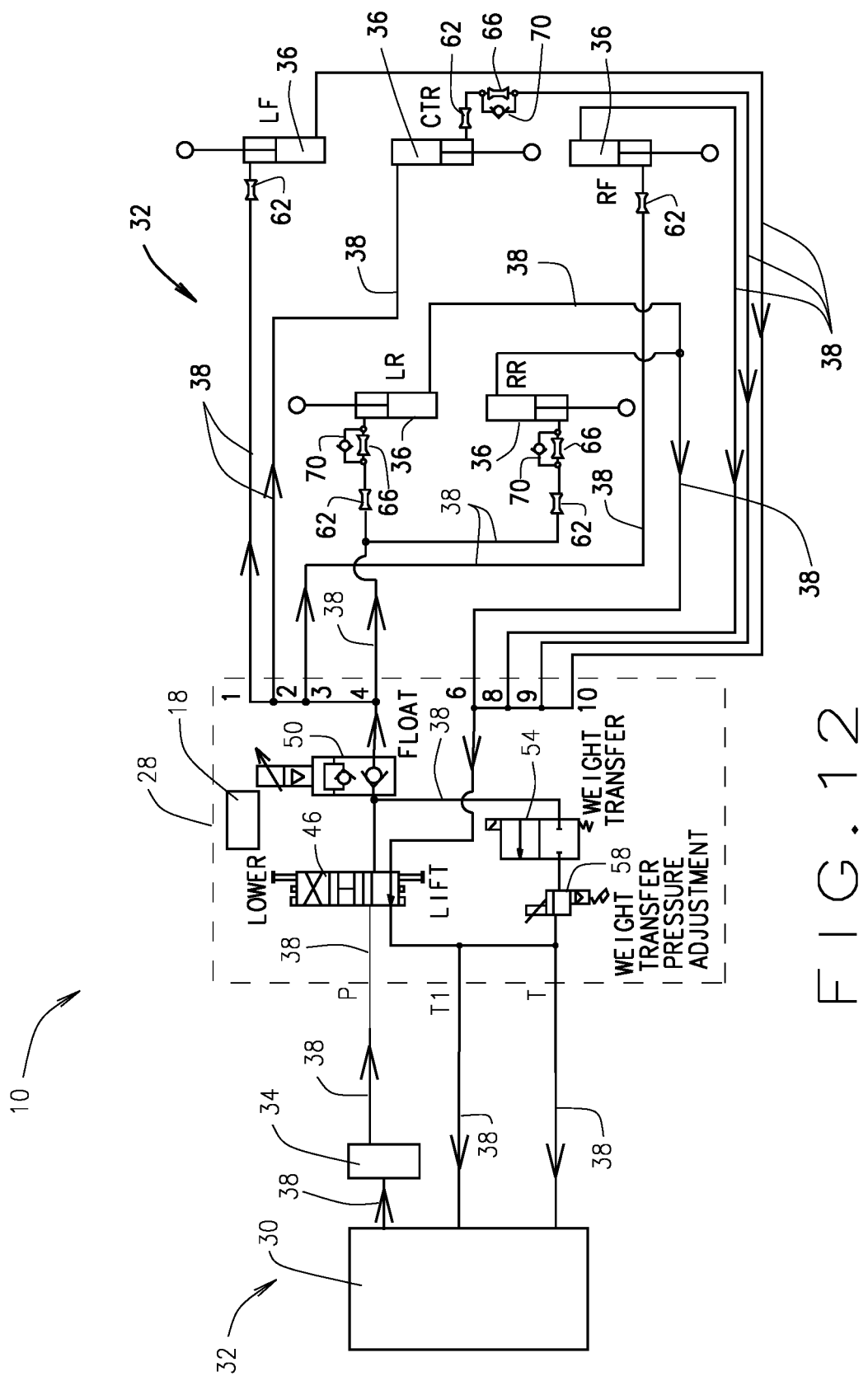
FIG. 12 is an exemplary schematic of the EHFC system wherein the electromechanical system thereof comprises the proportional flow control float valve float valve, and wherein the electromechanical system is configured in a lifting state in accordance with various embodiments of the present disclosure.

FIG. 12 exemplarily illustrates the electromechanical fluid flow control system 28 configured to implement a lifting state of the EHFC system 10, in accordance with various embodiments wherein the float valve 50 can be a proportional flow control valve. As described above, the lifting state refers to lifting of the cutting implements 12 to the raised position and placed or configured in the transport mode. When in the lifting state, the control module 18 (via execution of the cutting implement mode control software) places the fluid routing valve 46 in the second position, the float valve 50 in the check position and the weight transfer valve 54 in the closed position. In the second position, the fluid routing valve 46 allows hydraulic fluid to flow from the tank 30 to the float valve 50, and hydraulic fluid to flow from the actuators 36 back to the tank 30. In the check position, the float valve 50 allows mono-directional hydraulic fluid flow therethrough from the tank 30 to the actuators 36. Particularly, when in the check position, the float valve 50 allows fluid flowing through the routing valve 46 from the tank 30 to flow to the actuators 36 but will prevent fluid from flowing from the actuators 36 back through the float valve 50 toward the tank 30. In the closed position, the weight transfer valve 54 prevents fluid flowing through the routing valve 46 from flowing directly back to the tank 30 and forces the fluid to flow through the float valve 50 to the actuators 36.

As described above, in various embodiments the hydraulic system 32 can further comprise the first orifice disc 62 in-line prior to one or more of the actuator 36 or subsequent to one or more of the actuator, and/or the hydraulic system 32 the second orifice disc 66 in-line prior to, or subsequent to, one or more of the actuators 36. The first orifice disc 62 and second orifice plate 66 are structured and operable to narrow the hydraulic fluid flow path, and thereby increase the hydraulic fluid pressure within the fluid lines 38 and restrict, reduce or slow the flow rate to and/or from the respective cutting implement actuator 36 to thereby restrict, reduce or slow the rate or speed of actuation and/or de-actuation of the hydraulic actuators 36, to thereby control the rate or speed of actuation and/or de-actuation of the hydraulic actuators 36, and hence the rate or speed of the lifting and/or lowering of the cutting implements 12.

In operation, when the electromechanical fluid flow control system 28 is configured to implement a lifting state of the EHFC system 10, the hydraulic fluid is pumped from the tank 30 by the pump 34 and flows, via the hydraulic lines 38, to and through the routing valve 46. After passing through the routing valve 46 the fluid flows, via the hydraulic lines 38, to and through the float valve 50. After passing through the float valve 50 the fluid flows, via the hydraulic lines 38, to and through the first orifice discs 62 disposed prior to one or more of the actuators 36. Thereafter, in various instances (e.g., with regard to the left rear and right rear cutting implement actuators 36) the fluid, bypasses the second orifice plates 66, via the check valve bypass loop 70. Thereafter, the fluid enters the actuators 36 expanding or extending the actuators 36 (e.g., pushing the hydraulic piston and piston rod outward) and lifting the cutting implements 12 at a desired rate or speed based on the size and structure of the orifice, hole or other type of passageway through the first disc 62 and/or the second orifice plate 66. For example, in various embodiments wherein various actuators 36 have the first orifice disc 62 disposed prior thereto, the desired rate or speed of lifting the cutting implements 12 is stipulated and controlled by the first orifice disc 62 (e.g., based on the size and structure (e.g., diameter) of the orifice, hole or passageway of the first orifice discs 62. As set forth above, in various embodiments, the orifice, hole or passageway of the first orifice discs 62 can have a diameter of 0.020 inches to 0.065 inches (e.g., 0.029 inches to 0.055 inches).

Figure 13:
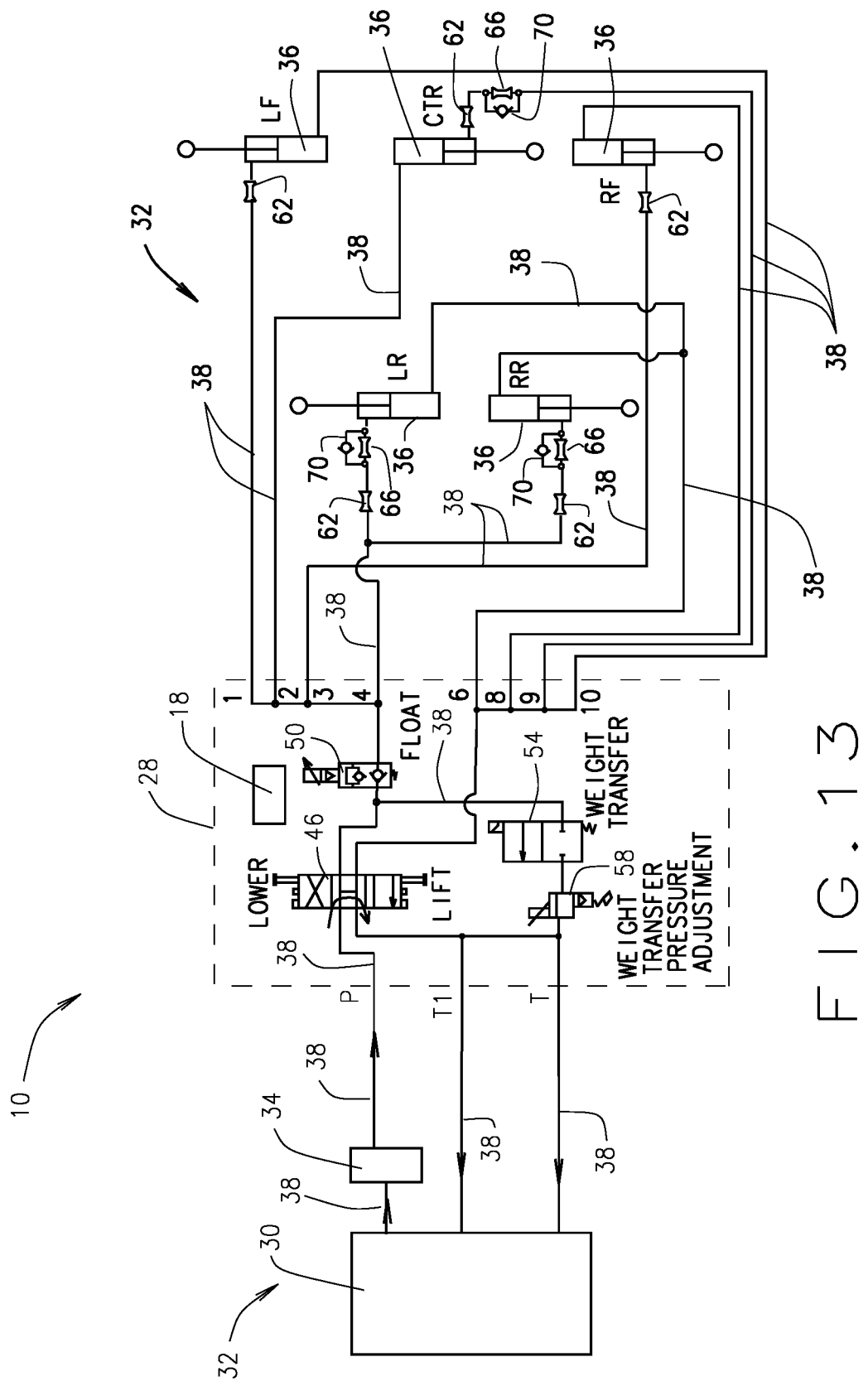
FIG. 13 is an exemplary schematic of the EHFC system wherein the electromechanical system thereof comprises the proportional flow control float valve float valve, and wherein the electromechanical system is configured in a holding state in accordance with various embodiments of the present disclosure.

Referring now to FIG. 13, once the cutting implements have been raised and placed in the transport mode, or lowered and placed in the cutting mode, the electromechanical fluid flow control system 28 can be configured to implement a holding state of the EHFC system 10, in accordance with various embodiments wherein the float valve 50 can be a proportional flow control valve. As described above, the holding state is very similar to the neutral state. When in the holding state, the control module 18 (via execution of the cutting implement mode control software) places the fluid routing valve 46 in the first position, the float valve 50 in the check position and the weight transfer valve 54 in the closed position. When the fluid routing valve 46 is in the first position, the hydraulic fluid pumped from the tank 30 into the fluid routing valve 46, via the hydraulic lines 38, is routed directly back to the tank 30, via the hydraulic lines 38. As described above, the float valve 50 allows mono-directional hydraulic fluid flow therethrough such that fluid is allowed to flow from the tank 30 to the actuators 36 but is prevented from flowing from the actuators 36 back through the float valve 50 toward the tank 30. Particularly, when in the check position the float valve 50 prevents fluid from flowing from the actuators 36 back through the float valve 50 toward the tank 30 so that the weight of the cutting implements 12 and the force of gravity on the cutting implements 12 cannot force fluid from the actuators 36 back through the fluid lines 38 to the tank 30. Hence, the cutting implements 12 are prevented from lowering via their weight and the force of gravity and are held in the raised position/transport mode, or the lowered position/cutting mode.

Figure 14:
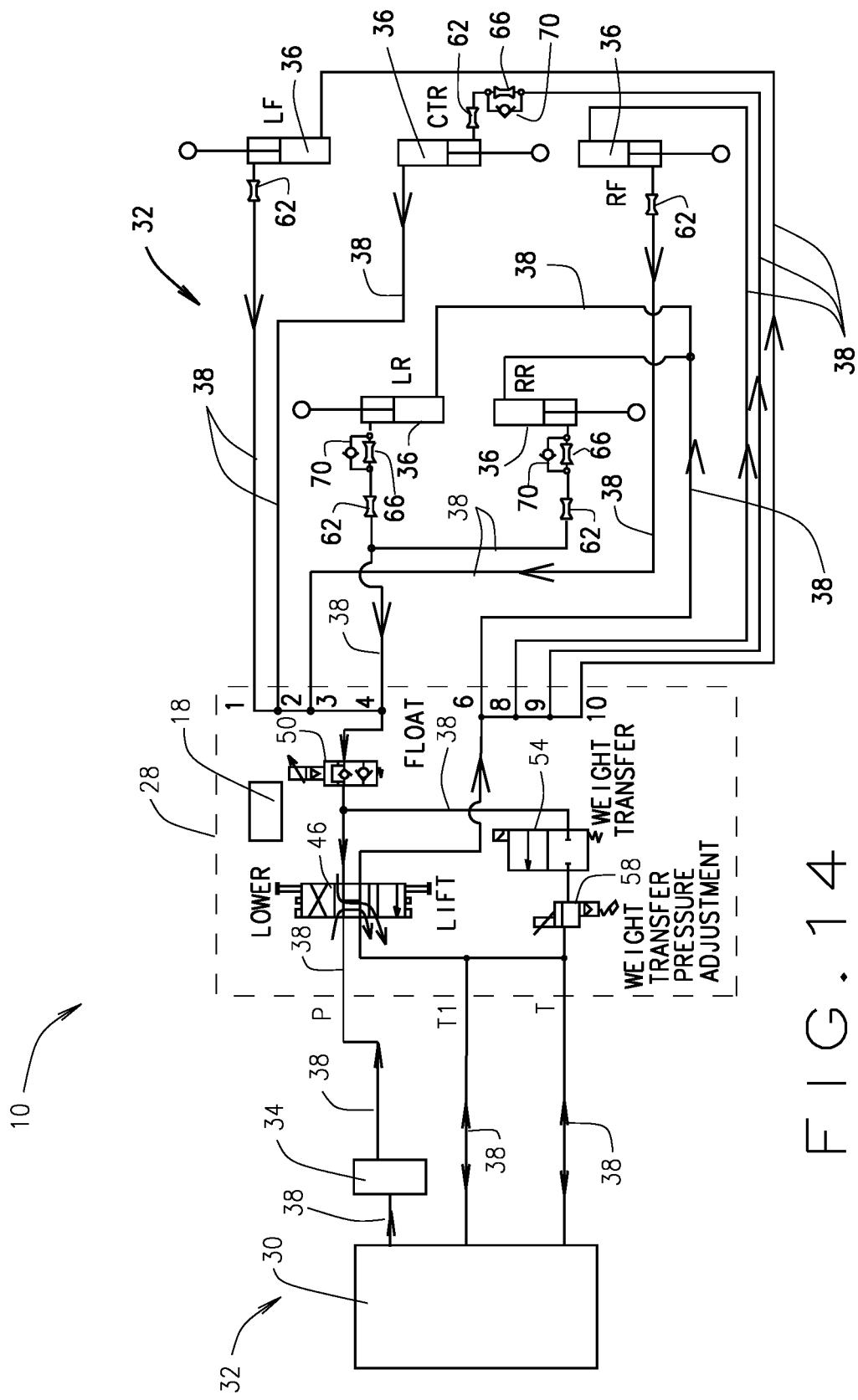
FIG. 14 is an exemplary schematic of the EHFC system wherein the electromechanical system thereof comprises the proportional flow control float valve float valve, and wherein the electromechanical system is configured in a lowering state in accordance with various embodiments of the present disclosure.

FIG. 14 exemplarily illustrates the electromechanical fluid flow control system 28 configured to implement a lowering state of the EHFC system 10 whereby the cutting implements 12 are lowered and placed or configured in the cutting mode, in accordance with various embodiments wherein the float valve 50 can be a proportional flow control valve. When in the lowering state, the control module 18 (via execution of the cutting implement mode control software) places the fluid routing valve 46 in the first position, the float valve 50 (e.g., the proportional flow control valve) in a flow metering/control position and the weight transfer valve 54 in the closed position. In the first position, in various instances of this embodiment, the routing valve 46 can return the fluid from the tank 30 directly back to the tank 30 and flow from the float valve 50 through the routing valve 46 back to the tank 30, and with the weight transfer valve 54 in the closed position no fluid is allowed to flow through the weight transfer valve 54. However, in this lowering configuration, with the float valve 50 in the metering/control position, the fluid flowing from the actuators 36 (e.g., from the pump-side inlet/outlet of the actuators 36) is allowed to flow through the float valve 50 where the control module controls operation of the float valve 50 such that the fluid flowing through the float valve 50 is metered or controlled. The fluid flow from the pump-side actuator inlet/outlets is generated via the weight of and gravitational force on the cutting implements 12.

More particularly, hydraulic fluid is displaced from the pump-side inlet/outlets of the actuators 36, via the weight of and gravitational force on the cutting implements 12, and flows through the float valve 50 where the fluid is metered or controlled by the float valve 50 (via control of the control module). The fluid then passes through the routing valve 46 and flows back to the tank 30. To replace the fluid expelled from the actuators 36, the actuators 36 draw fluid from the tank 30 into the tank-side inlet/outlets from the tank 30.

Accordingly, as the fluid flows through the float valve 50, the float valve 50 is electrically operated and controlled by the control module 18 in accordance with the execution of the cutting implement mode control software (e.g., a pulse-width-modulation function) such that the pressure and rate of fluid flowing therethrough is regulated, metered, modulated or otherwise controlled, thereby regulating, metering, modulating or otherwise controlling the speed at which the cutting implements 12 are lowered to the ground (i.e., controlling a decent rate of the cutting implements 12). Hence, lowering of the cutting implements 12 can be controlled to have a decent rate whereby the cutting implements 12 contact the ground without making impressions or indentations in, or otherwise damaging, the ground. As described above, in various embodiments wherein the hydraulic system 32 includes the first discs 62 and/or second orifice plates 66, the pressure and flow rate of the fluid flowing from the actuators 36 is further regulated by the first orifice disc and/or the second orifice plate 66 to further control the speed at which the cutting implements 12 are lowered to the ground (i.e., further control of the decent rate of the cutting implements 12). For example, in various embodiments wherein the first orifice disc 62 and/or the second orifice plate 66 is/are disposed prior to the pump-side inlet/outlet of one or more actuator 36, the fluid will flow through the first orifice disc 62 and/or the second orifice plate 66 whereby the pressure and flow rate is controlled by the size and structure (e.g., diameter) of the orifice(s) in the first orifice disc 62 and/or the second orifice plate 66, as described above.

Figure 15:
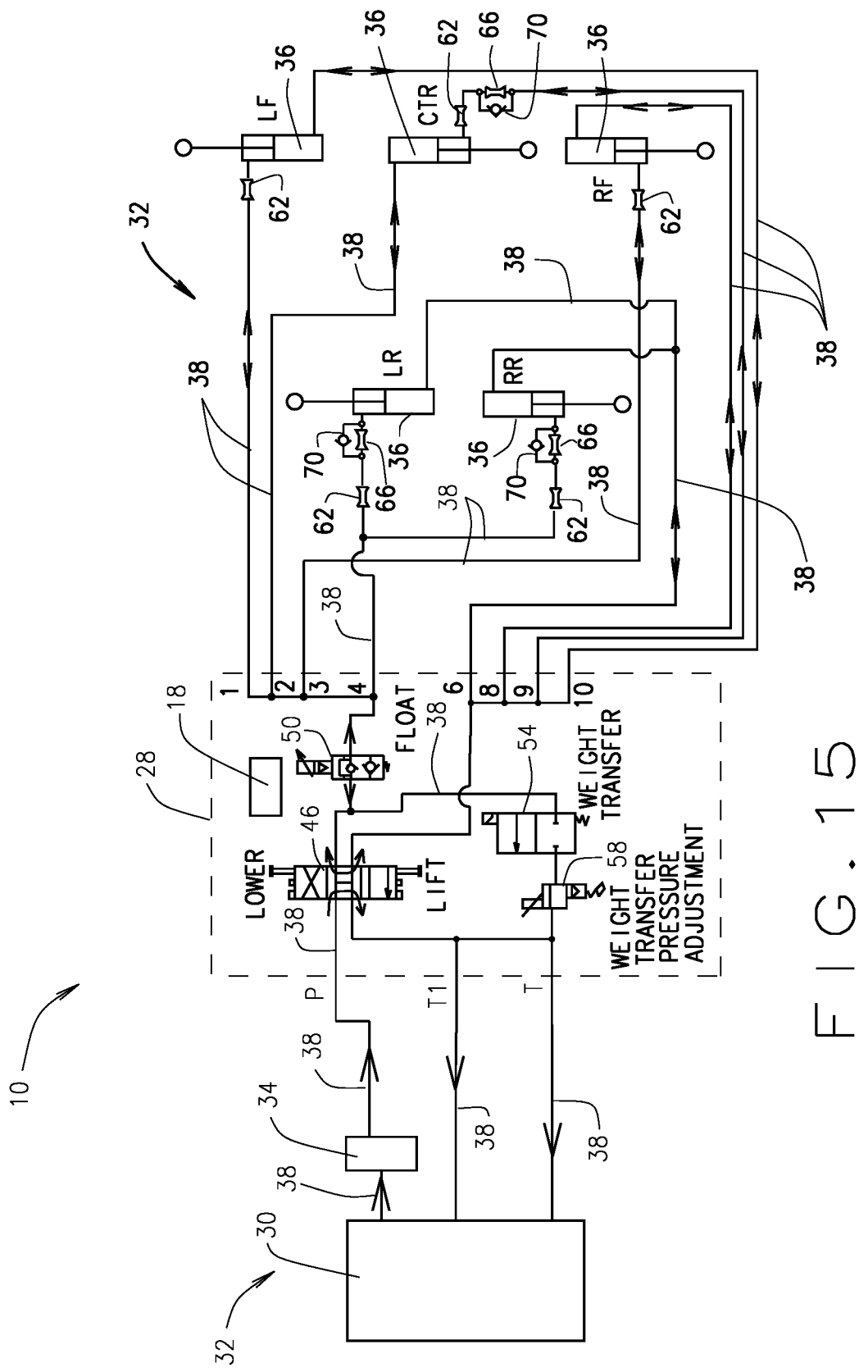
FIG. 15 is an exemplary schematic of the EHFC system wherein the electromechanical system thereof comprises the proportional flow control float valve float valve, and wherein the electromechanical system is configured in a floating state in accordance with various embodiments of the present disclosure.

FIG. 15 exemplarily illustrates the electromechanical fluid flow control system 28 configured to implement a floating state of the EHFC system 10 whereby the cutting implements 12 are allowed to 'float' across the contour of the terrain over which the turf mower 14 and cutting implements 12 are traversing, in accordance with various embodiments wherein the float valve 50 can be a proportional flow control valve. That is, the EHFC system 10 is configured to control movement the cutting implements 12 such that the cutting implements 12 can quickly move in response to the contour of the terrain over which the turf mower 14 and cutting implements 12 are traversing (i.e., quickly raise, lift, lower, fall, tilt, cant, pitch, yaw, roll, etc., in accordance with the contour of the terrain over which the turf mower 14 and cutting implements 12 are traversing). When in the floating state, the control module 18 (via execution of the cutting implement mode control software) places the fluid routing valve 46 in the first position (also referred to as an open center position), the float valve 50 in flow metering/control position and the weight transfer valve 54 in the closed position. When the fluid routing valve 46 is in the first position (e.g., the open center position), the hydraulic fluid pumped from the tank 30 into the fluid routing valve 46 is routed directly back to the tank 30 and does no work on the hydraulic system 32. With the weight transfer valve 54 in the closed position no fluid is allowed to flow through the weight transfer valve 54. As described above, when in the metering/control position, the float valve 50 meters or controls the flow of fluid therethrough. Particularly, when EHFC system 10 is configured in the floating state, the control module 18 controls the float valve 50 such that hydraulic fluid is allowed to bidirectionally flow therethrough to and from the actuators 36 with little or no restriction.

Therefore, the actuators 36 are isolated, and the fluid is forced to bi-directionally circulate back and forth to and from the actuators 36 through the routing valve 46 and the float valve 50 due to up and down movement of the cutting implements 12 as they traverse the uneven or undulating ground surface. Particularly, the portion of the hydraulic system 32 comprising the actuators 36 is communicatively (i.e., fluid communication of hydraulic fluid) isolated from the portion of the hydraulic system comprising the tank 30 and pump 34 via the electromechanical system 28, particularly via the routing valve 46 and the weight transfer valve 54. Therefore, with the routing valve 46 and the weight transfer valve 54 in the first and closed position, respectively, fluid from the actuators passing through the float valve 50 in either direction will be routed back to the opposite ends of the actuators 36 with little or no restriction, control or metering by the float valve 50. Generally, the fluid is allowed to flow to and from the actuators 36 with little or no control of the pressure and flow rate by the electromechanical system 28. Accordingly, the movement of actuators 36 is generally generated only by the movement of the cutting implements 12 as the cutting implements 12 move across the ground and raise, lift, lower, fall, tilt, cant, pitch, yaw, roll, etc., in accordance with the contour of the ground surface. More particularly, the cutting implements 12 are allowed to float across the ground. That is, the cutting implements 12 are allowed to quickly raise, lift, lower, fall, tilt, cant, pitch, yaw, roll, etc., in accordance with the contour of the terrain over which the turf mower 14 and cutting implements 12 are traversing, thereby providing an even, uniform turf height cut. Hence, when in the EHFC system 10 is in the float configuration, the pressure and flow control of the hydraulic fluid within the hydraulic lines 38 flowing to and from the actuators 36 is electronically eliminated the to enable unrestricted float of the cutting implements 12 and improved ground contour following capability of the cutting implements 12.

Figure 16:
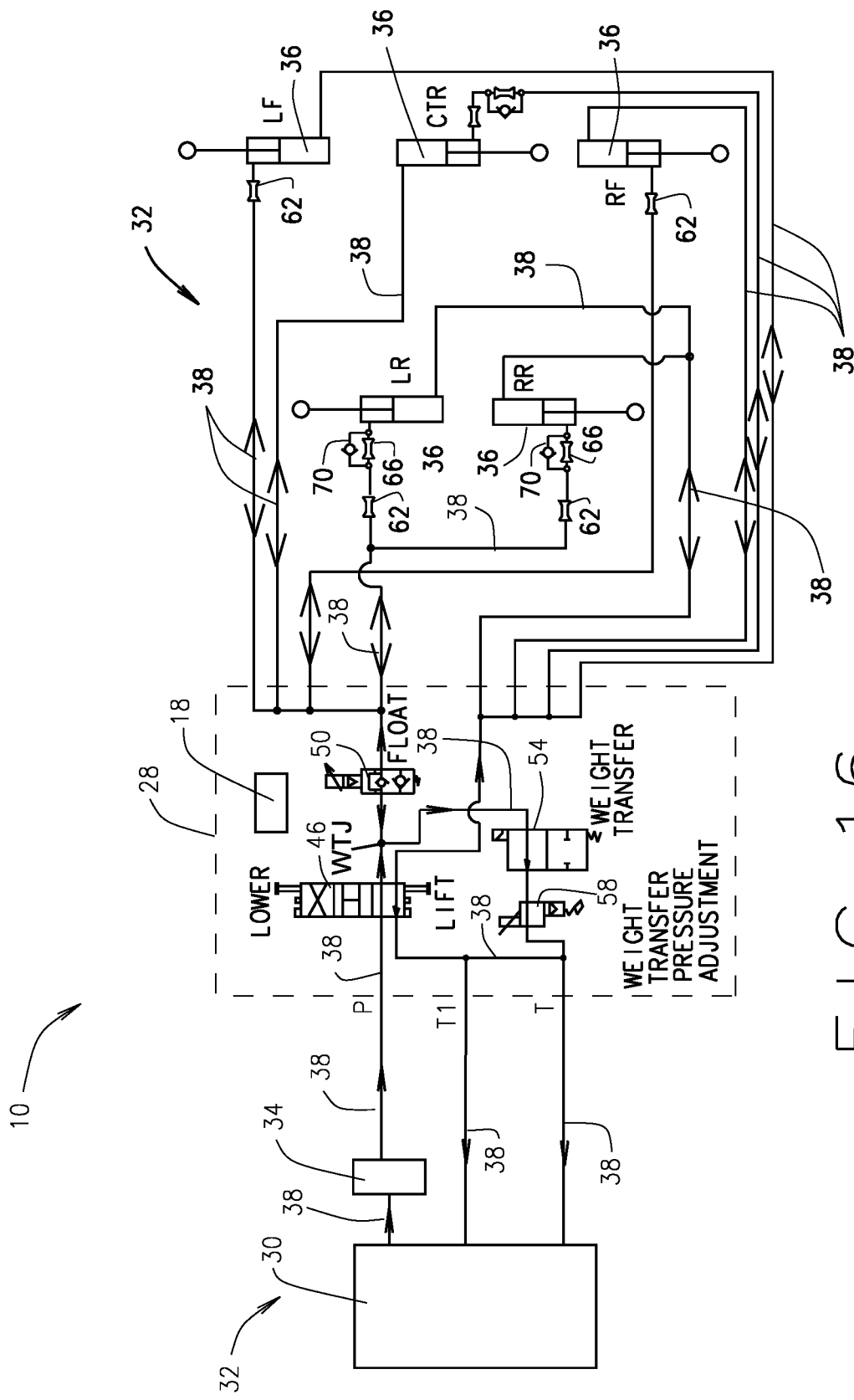
FIG. 16 is an exemplary schematic of the EHFC system wherein the electromechanical system thereof comprises the proportional flow control float valve float valve, and wherein the electromechanical system is configured in a weight transfer state in accordance with various embodiments of the present disclosure.

FIG. 16 exemplarily illustrates the electromechanical fluid flow control system 28 configured to implement a weight transfer state of the EHFC system 10, in accordance with various embodiments wherein the float valve 50 can be a proportional flow control valve. When in the weight transfer state, the control module 18 (via execution of the cutting implement mode control software) places the fluid routing valve 46 in the second position, the float valve 50 in the flow metering/control position and the weight transfer valve 54 in the weight transfer position. In the second position, the fluid routing valve 46 allows hydraulic fluid to flow from the tank 30 to the float valve 50, and hydraulic fluid to flow from the actuators 36 back to the tank 30. As described above, when the float valve 50 is in the flow metering/control position fluid is allowed to bi-directionally flow therethrough from the tank 30 to the actuators 36 and from the actuators 36 to the tank 30 with little or no restriction. In the open position, the weight transfer valve 54 allows fluid flowing through the routing valve 46 and fluid flowing from the actuators 36 to flow therethrough to the WTPA valve 58 and back to the tank 30. However, the WTPA valve 58 is electrically operated and controlled by the control module 18 to control the pressure and rate of fluid flowing therethrough to control the pressure the cutting implements 12 exert on the ground when in the lowered position/cutting mode.

In operation, when the electromechanical fluid flow control system 28 is configured to implement a weight transfer state of the EHFC system 10, the hydraulic fluid is pumped from the tank 30 by the pump 34 and flows, via the hydraulic lines 38, to and through the routing valve 46. Simultaneously, with the float valve 50 in the open/control position, the weight of the cutting implements 12 and the force of gravity on the cutting implements 12 forces fluid out of the actuators 36 generating a fluid flow back to and through the float valve 50. The fluid flowing from the tank 30 and the fluid flowing from the actuators 36 converge and merge at the weight transfer junction WTJ of the fluid lines 38 between the fluid routing valve 46 and the float valve 50. The fluid flowing from the tank 30 causes a back pressure on the fluid flowing from the actuators 36 that increases the pressure within the fluid lines 38 and causes a slowing of the flow rate and from the actuators 36. At the weight transfer junction WTJ of the fluid lines 38 the merged fluid from the tank 30 and from the actuators 36 is directed to and through the weight transfer valve 54.

Thereafter, the merged fluid passing through the weight transfer valve 54 enters the WTPA valve 58. As described above, operation of the WTPA valve 58 is controlled by the control module 18 in accordance with the execution of the cutting implement mode control software. For example, the WTPA valve 58 is controlled via execution of a weight transfer function of the cutting implement mode control software (e.g., a pulse-width-modulation function). Specifically, the control module 18 controls the WTPA valve 58 such that the pressure and flow rate of the merged fluid from the weight transfer valve 54 is metered or controlled. More specifically, the control module 18 controls the operation of the WTPA valve 58 such that the merged fluid pressure and flow rate (i.e., pressure and flow rate of the fluid from the tank 30 merged with fluid from the actuators 36) is regulated, metered, modulated or otherwise controlled, thereby regulating, metering, modulating or otherwise controlling the force the cutting implements 12 exert on the ground when in the lowered position/cutting mode.

As described above, the weight transfer state is a state that is entered after the cutting implements 12 have been lowered to the lowered position/cutting mode, as described above. In various embodiments, the weight transfer state is automatically implemented upon engaging the cutting mode. When in the weight transfer state, hydraulic fluid flows through the routing valve 46, through the weight transfer valve 54, and is metered or controlled by the WTPA 58 and flows back to tank 30. This creates a back pressure, as described above, to bias the weight of the cutting implements 12, effectively making them lighter and transferring more of the turf mower 14 weight back onto the traction wheels 42. Without weight transfer state, the downward pressure on the cutting implements 12 due to the force of gravity would be borne by the cutting implements 12 themselves, resulting in less turf mower 14 weight being applied to the ground contact areas of the traction wheels 42 and less available traction for the turf mower 14. Biasing the weight of the cutting implements 12 to be lighter transfers some of the weight of the cutting implements 12 back through the cutting implement lift arms, through the turf mower frame, and to the traction wheels 14, thereby improving traction. Note that the cutting implements 12 are not lifted off the ground in weight transfer mode. However, the weight transfer mode does effectively make the cutting implements 12 lighter and the weight of the turf mower heavier on the traction wheels 14.

As described above, the control module 18 can be any computer-based module of the turf mower 10 and/or the EHFC system 10. Alternatively, in various other embodiments, it is envisioned that the control module 18 can be a hardware based module that is structured and operable to implement the cutting implement mode control software functionality as described herein. For example, it is envisioned that the control module 18 can comprise one or more, or be part of, application specific integrated circuit(s) (e.g., ASIC(s)), combinational logic circuit(s); field programmable gate array(s) (FPGA); processor(s) (shared, dedicated, or group) that execute software code; and/or other suitable hardware components that provide the functionality described herein; or a combination of some or all of the above, such as in a system-on-chip, and remain within the scope of the present disclosure.

Furthermore, it should be understood that, although the various EHFC system 10 operations and functionality are often described herein as being implemented or carried out by control module 18, it will be appreciated that in some embodiments the control module 18 can indirectly perform and/or control performance of such operations and functionality by generating commands and control signals that can cause other elements to carry out the control operations and functionality described herein. For example, in the various executable software embodiments, it is the execution of the cutting implement mode control software by one or more processors of the control module 18 that can generate the electromechanical fluid flow control system 28 control commands that are then output by the control module 18 to control the EHFC system 10 operations and functions as described herein. Or, in the various hardware embodiments, it is the operation of the various control module 18 hardware components that can generate the commands that are then output by the control module 18 to control the EHFC system 10 operations and functions as described herein.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. An electro-hydraulic flow control system for controlling the movement of a cutting implement of a turf mower, said system comprising:
   a hydraulic system structured and operable to raise the cutting implement to a transport mode and lower the cutting implement to a cutting mode, the hydraulic system comprising:
      a hydraulic fluid tank structured and operable to retain hydraulic fluid;

a hydraulic actuator connected to the cutting implement and structured and operable to raise and lower the cutting implement;

a plurality of hydraulic fluid lines fluidly connecting the hydraulic actuator to the hydraulic fluid tank; and a hydraulic pump fluidly connected to the hydraulic fluid tank and the hydraulic actuator and structured and operable to pump hydraulic fluid from the hydraulic fluid tank to the hydraulic actuator; and an electromechanical fluid flow control system structured and operable to control a flow of the hydraulic fluid through the hydraulic system, the electromechanical fluid control system comprising:

a routing valve structured and operable to be movable between a first position, and a second position to control the routing of the hydraulic fluid through the electromechanical fluid flow control system;

a float valve structured and operable to be movable between a check position to mono-directionally control the flow of hydraulic fluid therethrough and a control position to bi-directionally control the flow of hydraulic fluid therethrough;

a weight transfer valve structured and operable to be movable between a weight transfer position to allow the hydraulic fluid mono-directionally flow therethrough and a closed position to prevent the flow of hydraulic fluid from flowing therethrough;

a weight transfer pressure adjustment (WTPA) valve structured and operable to control the flow of hydraulic fluid therethrough from the weight transfer valve to the hydraulic fluid tank; and a control module structured and operable to control operation of the routing valve, the float valve, the weight transfer valve, and the WTPA valve to control operation of the hydraulic actuator and thereby control movement of the cutting implement.

2. The system of claim 1 wherein the control module is structured and operable to place the routing valve in the second position, the float valve in the check position, and the weight transfer valve in the closed position such that the pump pumps hydraulic fluid to the hydraulic actuator to raise the cutting implement to a transport position at a desired rate of speed.

3. The system of claim 2 wherein the control module is structured and operable to:

place the routing valve in the second position, the float valve in the control position, and the weight transfer valve in the weight transfer position such that hydraulic fluid from the hydraulic actuator flows through the float valve and merges with fluid pumped from the hydraulic fluid tank through the routing valve, whereby the merged fluid flows through the weight transfer valve to the WTPA valve, and operate the WTPA valve such that a flow rate of the merged fluid passing through WTPA valve is controlled to lower the cutting implement to the ground surface at a desired decent rate such that the cutting implement contacts the ground without damaging the ground.

4. The system of claim 3 wherein the control module is structured and operable to place the routing valve in the first position, the float valve in the control position, and the weight transfer valve in the closed position such that hydraulic fluid is allowed to bidirectionally flow through the routing valve and the float valve between a first inlet/outlet and a second inlet/outlet of the hydraulic actuator such that the cutting implement can quickly move in response to the contour of the ground surface over which the turf mower and the cutting implement is traversing.

5. The system of claim 2 wherein the control module is structured and operable to:

place the routing valve in the first position, the float valve in the control position, and the weight transfer valve in the closed position such that hydraulic fluid from the hydraulic actuator flows through the float valve back to the hydraulic fluid tank through the routing valve, and operate the float valve such that a flow rate of the fluid passing therethrough is controlled to lower the cutting implement to the ground surface at a desired decent rate such that the cutting implement contacts the ground without damaging the ground.

6. The system of claim 5 wherein the control module is structured and operable to:

place the routing valve in the first position, the float valve in the control position, and the weight transfer valve in the closed position such that hydraulic fluid from the hydraulic actuator flows through the float valve back to the hydraulic fluid tank through the routing valve, and operate the float valve such that the fluid passing therethrough is allowed to bidirectionally flow therethrough to and from the hydraulic actuator with little or no restriction such that the cutting implement can quickly move in response to the contour of the ground surface over which the turf mower and cutting implement is traversing.

7. A turf mower, said turf mower comprising:

an internal combustion engine;

a cutting implement structure and operable to cut turf; and an electro-hydraulic flow control system for controlling the movement of the cutting implement, said system comprising:

a hydraulic system structured and operable to raise the cutting implement to transport mode and lower the cutting implement to a cutting mode, the hydraulic system comprising:

a hydraulic fluid tank structured and operable to retain hydraulic fluid;

a hydraulic actuator connected to the cutting implement and structured and operable to raise and lower the cutting implement;

a plurality of hydraulic fluid lines fluidly connecting the hydraulic actuator to the hydraulic fluid tank; and a hydraulic pump fluidly connected to the hydraulic fluid tank and the hydraulic actuator and structured and operable to pump hydraulic fluid from the hydraulic fluid tank to the hydraulic actuator; and an electromechanical fluid flow control system structured and operable to control a flow of the hydraulic fluid through the hydraulic system, the electromechanical fluid control system comprising:

a routing valve structured and operable to be movable between a first position, and a second position to control the routing of the hydraulic fluid through the electromechanical fluid flow control system;

a float valve structured and operable to be movable between a check position to mono-directionally control the flow of the hydraulic fluid therethrough and a control position to bi-directionally control the flow of hydraulic fluid therethrough;

a weight transfer valve structured and operable to be movable between a weight transfer position to allow the hydraulic fluid mono-directionally flow therethrough and a closed position to prevent the flow of hydraulic fluid from flowing therethrough;

a weight transfer pressure adjustment (WTPA) valve structured and operable to control the flow of hydraulic fluid therethrough from the weight transfer valve to the hydraulic fluid tank; and a control module structured and operable to control operation of the routing valve, the float valve, the weight transfer valve, and the WTPA valve to control operation of the hydraulic actuator and thereby control movement of the cutting implement.

8. The mower of claim 7 wherein the control module is structured and operable to place the routing valve in the second position, the float valve in the check position, and the weight transfer valve in the first position such that the pump pumps hydraulic fluid to the hydraulic actuator to raise the cutting implement to a transport position at a desired rate of speed.

9. The mower of claim 8 wherein the control module is structured and operable to:

place the routing valve in the second position, the float valve in the control position, and the weight transfer valve in the weight transfer position such that hydraulic fluid from the hydraulic actuator flows through the float valve and merges with fluid pumped from the hydraulic fluid tank through the routing valve, whereby the merged fluid flows through the weight transfer valve to the WTPA valve, and operate the WTPA valve such that a flow rate of the merged fluid passing through WTPA valve is controlled to lower the cutting implement to the ground surface at a desired decent rate such that the cutting implement contacts the ground without damaging the ground.

10. The mower of claim 9 wherein the control module is structured and operable to place the routing valve in the first position, the float valve in the control position, and the weight transfer valve in the closed position such that hydraulic fluid is allowed to bidirectionally flow through the routing valve and the float valve between a first inlet/outlet and a second inlet/outlet of the hydraulic actuator such that the cutting implement can quickly move in response to the contour of the ground surface over which the turf mower and the cutting implement is traversing.

11. The mower of claim 8 wherein the control module is structured and operable to:

place the routing valve in the first position, the float valve in the control position, and the weight transfer valve in the closed position such that hydraulic fluid from the hydraulic actuator flows through the float valve back to the hydraulic fluid tank through the routing valve, and operate the float valve such that a flow rate of the fluid passing therethrough is controlled to lower the cutting implement to the ground surface at a desired decent rate such that the cutting implement contacts the ground without damaging the ground.

12. The mower of claim 11 wherein the control module is structured and operable to:

place the routing valve in the first position, the float valve in the control position, and the weight transfer valve in the closed position such that hydraulic fluid from the hydraulic actuator flows through the float valve back to the hydraulic fluid tank through the routing valve, and operate the float valve such that the fluid passing therethrough is allowed to bidirectionally flow therethrough to and from the hydraulic actuator with little or no restriction such that the cutting implement can quickly move in response to the contour of the ground surface over which the turf mower and cutting implement is traversing.

13. A method for controlling the movement of a cutting implement of a turf mower, the mower comprising a hydraulic system structured and operable to raise the cutting implement to transport mode and lower the cutting implement to a cutting mode, the hydraulic system including a hydraulic fluid tank structured and operable to retain hydraulic fluid, a hydraulic actuator connected to the cutting implement and structured and operable to raise and lower the cutting implement, and a hydraulic pump fluidly connected to the hydraulic fluid tank and the hydraulic actuator and structured and operable to pump hydraulic fluid from the hydraulic fluid tank to the hydraulic actuator; and an electromechanical fluid flow control system structured and operable to control a flow of the hydraulic fluid through the hydraulic system, the electromechanical fluid control system including a routing valve movable between a first position and an second position to control the routing of the hydraulic fluid through the electromechanical fluid flow control system, a float valve movable between a check position to mono-directionally control the flow of hydraulic fluid therethrough and a control position to bi-directionally control the flow of hydraulic fluid therethrough, a weight transfer valve movable between a weight transfer position to allow the hydraulic fluid mono-directionally flow therethrough and a closed position to prevent the flow of hydraulic fluid from flowing therethrough, a weight transfer pressure adjustment (WTPA) valve structured and operable to control the flow of hydraulic fluid therethrough from the weight transfer valve to the hydraulic fluid tank, and a control module structured and operable to control operation of the routing valve, the float valve, the weight transfer valve, and the WTPA valve to control operation of the hydraulic actuator and thereby control movement of the cutting implement, said method comprising one of:

controlling, via the control module, the WTPA valve to meter the rate of hydraulic fluid flow therethrough to raise the cutting implement to a transport position at a first speed, and to lower the cutting implement to a cutting position at a second speed; and controlling, via the control module, the float valve to meter the rate of hydraulic fluid flow therethrough to raise the cutting implement to a transport position at the first speed, and to lower the cutting implement to a cutting position at the second speed.

14. The method of claim 13 wherein the method further comprises placing, via the control module, the routing valve in the second position, the float valve in the check position, and the weight transfer valve in the closed position, and pumping, via the pump, hydraulic fluid to the hydraulic actuator to raise the cutting implement to the transport position at a desired rate of speed.

15. The method of claim 14 wherein controlling the WTPA valve comprises:

placing, via the control module, the routing valve in the second position, the float valve in the control position, and the weight transfer valve in the weight transfer position such that hydraulic fluid from the hydraulic actuator flows through the float valve and merges with fluid pumped from the hydraulic fluid tank through the routing valve, whereby the merged fluid flows through the weight transfer valve to the WTPA valve, and operating, via the control module, the WTPA valve such that a flow rate of the merged fluid passing through WTPA valve is controlled to lower the cutting implement to the ground surface at a desired decent rate such that the cutting implement contacts the ground without damaging the ground.

16. The method of claim 15 wherein the method further comprises placing, via the control module, the routing valve in the first position, the float valve in the control position, and the weight transfer valve in the closed position such that hydraulic fluid is allowed to bidirectionally flow through the routing valve and the float valve between a first inlet/outlet and a second inlet/outlet of the hydraulic actuator such that the cutting implement can quickly move in response to the contour of the ground surface over which the turf mower and the cutting implement is traversing.

17. The method of claim 14 wherein controlling the float valve comprises:
placing, via the control module, the routing valve in the first position, the float valve in the control position, and the weight transfer valve in the closed position such that hydraulic fluid from the hydraulic actuator flows through the float valve back to the hydraulic fluid tank through the routing valve, and operating, via the control module, the float valve such that a flow rate of the fluid passing therethrough is controlled to lower the cutting implement to the ground surface at a desired decent rate such that the cutting implement contacts the ground without damaging the ground.

18. The method of claim 17 wherein the controlling the float valve further comprises:
placing, via the control module, the routing valve in the first position, the float valve in the control position, and the weight transfer valve in the closed position such that hydraulic fluid from the hydraulic actuator flows through the float valve back to the hydraulic fluid tank through the routing valve, and operating, via the control module, the float valve such that the fluid passing therethrough is allowed to bidirectionally flow therethrough to and from the hydraulic actuator with little or no restriction such that the cutting implement can quickly move in response to the contour of the ground surface over which the turf mower and the cutting implement are traversing.

* * * * *